US012562881B2

(12) United States Patent
Zhang et al.

(10) Patent No.: US 12,562,881 B2
(45) Date of Patent: Feb. 24, 2026

(54) ENHANCED TIMING ADVANCE OFFSET VALUE INDICATIONS

(71) Applicant: QUALCOMM Incorporated, San Diego, CA (US)

(72) Inventors: Qian Zhang, Basking Ridge, NJ (US); Navid Abedini, Basking Ridge, NJ (US); Yan Zhou, San Diego, CA (US); Peter Gaal, San Diego, CA (US); Jing Sun, San Diego, CA (US); Tianyang Bai, Somerville, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/446,917

(22) Filed: Sep. 3, 2021

(65) Prior Publication Data

US 2022/0085964 A1 Mar. 17, 2022

Related U.S. Application Data

(60) Provisional application No. 63/078,663, filed on Sep. 15, 2020.

(51) Int. Cl.
| | |
|---|---|
| *H04L 5/14* | (2006.01) |
| *H04W 56/00* | (2009.01) |
| *H04W 72/50* | (2023.01) |

(52) U.S. Cl.
CPC ........... *H04L 5/14* (2013.01); *H04W 56/0015* (2013.01); *H04W 72/535* (2023.01)

(58) Field of Classification Search
CPC ....... H04L 5/14; H04L 5/0078; H04L 5/1423; H04L 5/1469; H04W 56/0015; H04W 56/0045; H04W 72/1257; H04W 72/535
See application file for complete search history.

(56) References Cited

U.S. PATENT DOCUMENTS

| | | | |
|---|---|---|---|
| 2014/0079033 A1* | 3/2014 | Bergstrom | ............ H04L 5/0078 |
| | | | 370/336 |
| 2018/0219654 A1* | 8/2018 | Chen | ........................ H04L 5/16 |

(Continued)

FOREIGN PATENT DOCUMENTS

| | | |
|---|---|---|
| CN | 111567105 A | 8/2020 |
| CN | 111630908 A | 9/2020 |

(Continued)

OTHER PUBLICATIONS

International Search Report and Written Opinion—PCT/US2021/071379—ISA/EPO—Dec. 23, 2021.

*Primary Examiner* — Jianye Wu
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a timing advance (TA) offset value for a high frequency range operating band. The UE may communicate in the high frequency range operating band, in accordance with the TA offset value. In some aspects, a UE may receive an indication of at least one of a TA offset value associated with a full-duplex communication mode of a base station or a TA offset value associated with a half-duplex communication mode of a base station. The UE may communicate, with the base station, in accordance with at least one of the TA offset value associated with the full-duplex communication mode of the base station or the TA offset value associated with the half-duplex communication mode of the base station. Numerous other aspects are provided.

32 Claims, 14 Drawing Sheets

900

(56) References Cited

U.S. PATENT DOCUMENTS

| | | | |
|---|---|---|---|
| 2019/0037514 A1* | 1/2019 | Seo | H04W 72/0413 |
| 2019/0150141 A1* | 5/2019 | Irukulapati | H04L 5/14 |
| | | | 370/280 |
| 2019/0387486 A1 | 12/2019 | Abedini et al. | |
| 2020/0235980 A1 | 7/2020 | John Wilson et al. | |
| 2021/0058884 A1* | 2/2021 | Liu | H04W 56/0015 |
| 2021/0227533 A1* | 7/2021 | Zhang | H04B 7/022 |
| 2022/0393753 A1* | 12/2022 | Nakayama | H04B 7/0617 |

FOREIGN PATENT DOCUMENTS

| | | | | |
|---|---|---|---|---|
| EP | 2869646 B1 * | 5/2019 | | H04W 56/003 |
| EP | 3644662 A1 | 4/2020 | | |
| WO | WO-2019091052 A1 * | 5/2019 | | H04L 5/14 |

\* cited by examiner

700

710 Receive, from a base station, an indication of a timing advance (TA) offset value for a high frequency range operating band 720 Communicate with the base station in the high frequency range operating band, in accordance with the TA offset value

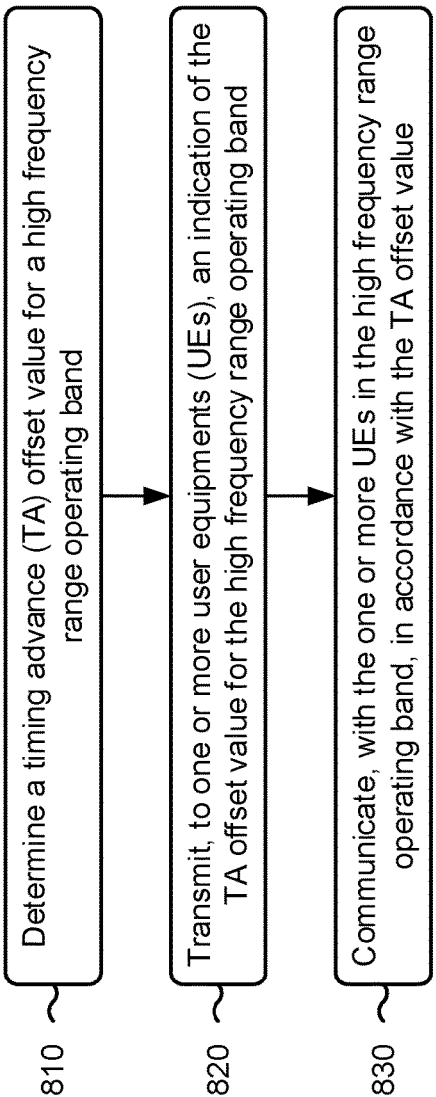
Determine a timing advance (TA) offset value for a high frequency range operating band
Transmit, to one or more user equipments (UEs), an indication of the TA offset value for the high frequency range operating band
Communicate, with the one or more UEs in the high frequency range operating band, in accordance with the TA offset value
810
820
830
800
FIG. 8

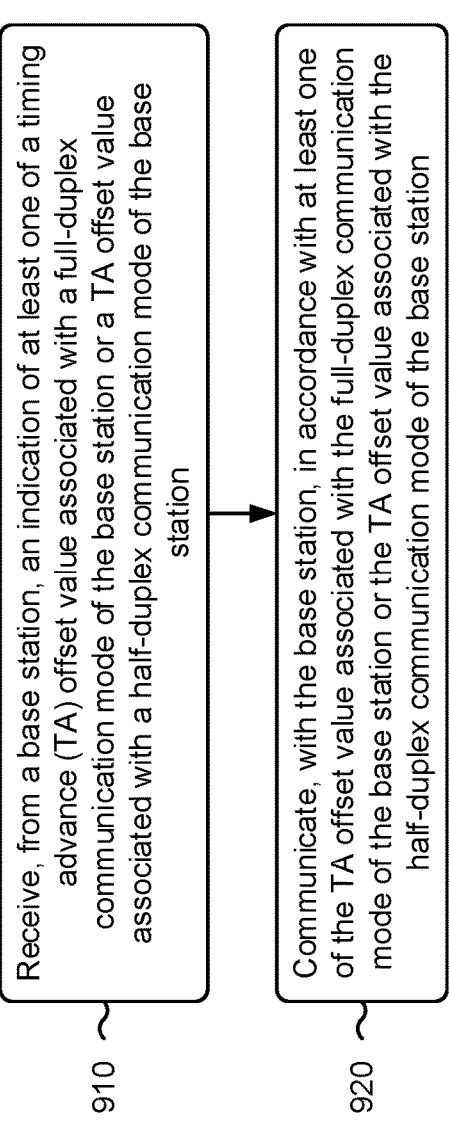

900

910 — Receive, from a base station, an indication of at least one of a timing advance (TA) offset value associated with a full-duplex communication mode of the base station or a TA offset value associated with a half-duplex communication mode of the base station 920 — Communicate, with the base station, in accordance with at least one of the TA offset value associated with the full-duplex communication mode of the base station or the TA offset value associated with the half-duplex communication mode of the base station

FIG. 9

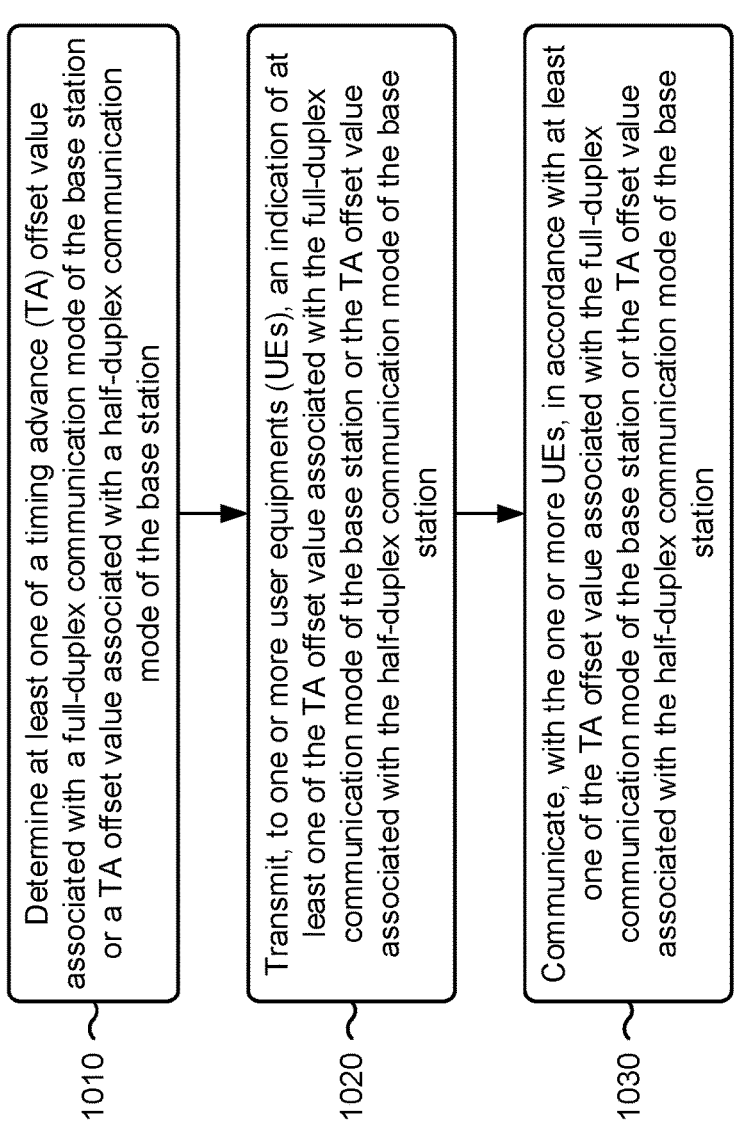

1010 — Determine at least one of a timing advance (TA) offset value associated with a full-duplex communication mode of the base station or a TA offset value associated with a half-duplex communication mode of the base station 1020 — Transmit, to one or more user equipments (UEs), an indication of at least one of the TA offset value associated with the full-duplex communication mode of the base station or the TA offset value associated with the half-duplex communication mode of the base station 1030 — Communicate, with the one or more UEs, in accordance with at least one of the TA offset value associated with the full-duplex communication mode of the base station or the TA offset value associated with the half-duplex communication mode of the base station

ENHANCED TIMING ADVANCE OFFSET VALUE INDICATIONS

CROSS-REFERENCE TO RELATED APPLICATION

This Patent Application claims priority to U.S. Provisional Patent Application No. 63/078,663, filed on Sep. 15, 2020, entitled "ENHANCED TIMING ADVANCE OFFSET VALUE INDICATIONS," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for enhanced timing advance (TA) offset value indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, an indication of a timing advance (TA) offset value for a high frequency range operating band; and communicating with the base station in the high frequency range operating band, in accordance with the TA offset value.

In some aspects, a method of wireless communication performed by a base station includes determining a TA offset value for a high frequency range operating band; transmitting, to one or more UEs, an indication of the TA offset value for the high frequency range operating band; and communicating, with the one or more UEs in the high frequency range operating band, in accordance with the TA offset value.

In some aspects, a method of wireless communication performed by a UE includes receiving, from a base station, an indication of at least one of a TA offset value associated with a full-duplex communication mode of the base station or a TA offset value associated with a half-duplex communication mode of the base station; and communicating, with the base station, in accordance with at least one of the TA offset value associated with the full-duplex communication mode of the base station or the TA offset value associated with the half-duplex communication mode of the base station.

In some aspects, a method of wireless communication performed by a base station includes determining at least one of a TA offset value associated with a full-duplex communication mode of the base station or a TA offset value associated with a half-duplex communication mode of the base station; transmitting, to one or more UEs, an indication of at least one of the TA offset value associated with the full-duplex communication mode of the base station or the TA offset value associated with the half-duplex communication mode of the base station; and communicating, with the one or more UEs, in accordance with at least one of the TA offset value associated with the full-duplex communication mode of the base station or the TA offset value associated with the half-duplex communication mode of the base station.

In some aspects, a UE for wireless communication includes a memory and one or more processors, coupled to the memory, configured to: receive, from a base station, an indication of a TA offset value for a high frequency range operating band; and communicate with the base station in the high frequency range operating band, in accordance with the TA offset value.

In some aspects, a base station for wireless communication includes a memory and one or more processors, coupled to the memory, configured to: determine a TA offset value for a high frequency range operating band; transmit, to one or more UEs, an indication of the TA offset value for the high frequency range operating band; and communicate, with the one or more UEs in the high frequency range operating band, in accordance with the TA offset value.

In some aspects, a UE for wireless communication includes a memory and one or more processors, coupled to the memory, configured to: receive, from a base station, an indication of at least one of a TA offset value associated with a full-duplex communication mode of the base station or a TA offset value associated with a half-duplex communication mode of the base station; and communicate, with the base station, in accordance with at least one of the TA offset value associated with the full-duplex communication mode of the base station or the TA offset value associated with the half-duplex communication mode of the base station.

In some aspects, a base station for wireless communication includes a memory; and one or more processors, coupled to the memory, configured to: determine at least one of a TA offset value associated with a full-duplex communication mode of the base station or a TA offset value associated with a half-duplex communication mode of the base station; transmit, to one or more UEs, an indication of at least one of the TA offset value associated with the full-duplex communication mode of the base station or the TA offset value associated with the half-duplex communication mode of the base station; and communicate, with the one or more UEs, in accordance with at least one of the TA offset value associated with the full-duplex communication mode of the base station or the TA offset value associated with the half-duplex communication mode of the base station.

In some aspects, a non-transitory computer-readable medium storing a set of instructions for wireless communication includes one or more instructions that, when executed by one or more processors of a UE, cause the UE to: receive, from a base station, an indication of a TA offset value for a high frequency range operating band; and communicate with the base station in the high frequency range operating band, in accordance with the TA offset value.

In some aspects, a non-transitory computer-readable medium storing a set of instructions for wireless communication includes one or more instructions that, when executed by one or more processors of a base station, cause the base station to: determine a TA offset value for a high frequency range operating band; transmit, to one or more UEs, an indication of the TA offset value for the high frequency range operating band; and communicate, with the one or more UEs in the high frequency range operating band, in accordance with the TA offset value.

In some aspects, a non-transitory computer-readable medium storing a set of instructions for wireless communication includes one or more instructions that, when executed by one or more processors of a UE, cause the UE to: receive, from a base station, an indication of at least one of a TA offset value associated with a full-duplex communication mode of the base station or a TA offset value associated with a half-duplex communication mode of the base station; and communicate, with the base station, in accordance with at least one of the TA offset value associated with the full-duplex communication mode of the base station or the TA offset value associated with the half-duplex communication mode of the base station.

In some aspects, a non-transitory computer-readable medium storing a set of instructions for wireless communication includes one or more instructions that, when executed by one or more processors of a base station, cause the base station to: determine at least one of a TA offset value associated with a full-duplex communication mode of the base station or a TA offset value associated with a half-duplex communication mode of the base station; transmit, to one or more UEs, an indication of at least one of the TA offset value associated with the full-duplex communication mode of the base station or the TA offset value associated with the half-duplex communication mode of the base station; and communicate, with the one or more UEs, in accordance with at least one of the TA offset value associated with the full-duplex communication mode of the base station or the TA offset value associated with the half-duplex communication mode of the base station.

In some aspects, an apparatus for wireless communication includes means for receiving, from a base station, an indication of a TA offset value for a high frequency range operating band; and means for communicating with the base station in the high frequency range operating band, in accordance with the TA offset value.

In some aspects, an apparatus for wireless communication includes means for determining a TA offset value for a high frequency range operating band; means for transmitting, to one or more UEs, an indication of the TA offset value for the high frequency range operating band; and means for communicating, with the one or more UEs in the high frequency range operating band, in accordance with the TA offset value.

In some aspects, an apparatus for wireless communication includes means for receiving, from a base station, an indication of at least one of a TA offset value associated with a full-duplex communication mode of the base station or a TA offset value associated with a half-duplex communication mode of the base station; and means for communicating, with the base station, in accordance with at least one of the TA offset value associated with the full-duplex communication mode of the base station or the TA offset value associated with the half-duplex communication mode of the base station.

In some aspects, an apparatus for wireless communication includes means for determining at least one of a TA offset value associated with a full-duplex communication mode of the apparatus or a TA offset value associated with a half-duplex communication mode of the apparatus; means for transmitting, to one or more UEs, an indication of at least one of the TA offset value associated with the full-duplex communication mode of the apparatus or the TA offset value associated with the half-duplex communication mode of the apparatus; and means for communicating, with the one or more UEs, in accordance with at least one of the TA offset value associated with the full-duplex communication mode of the apparatus or the TA offset value associated with the half-duplex communication mode of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-10 are diagrams illustrating example processes associated with enhanced TA offset value indications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
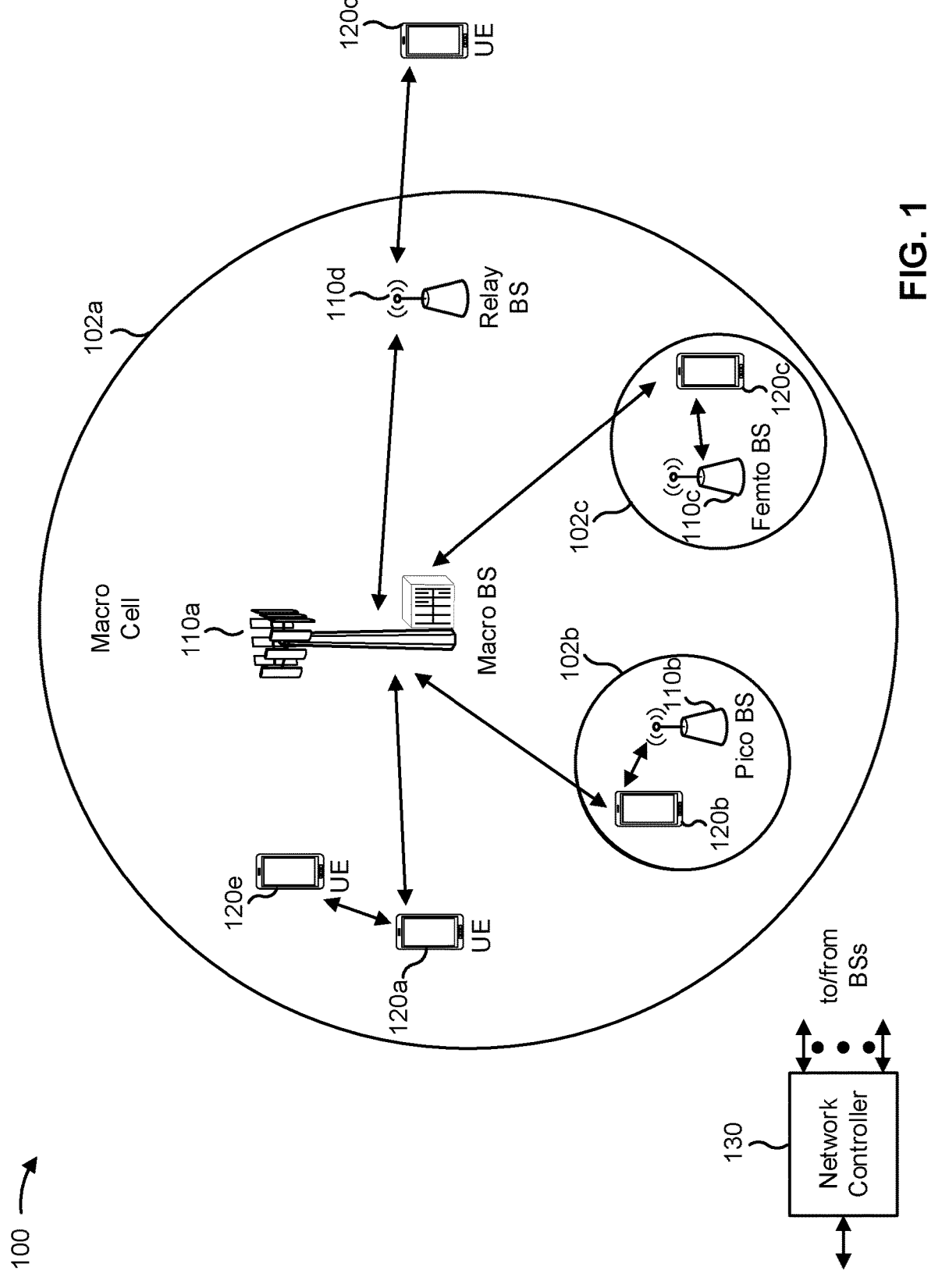
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE).

UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Moreover, it is anticipated that one or more additional frequency ranges (FRs) may be formally identified. For example, there is an expectation that an FR3, an FR4, and/or an FR5 may be further identified for 5G NR, each of which may correspond to one or more millimeter wave bands. For example, an anticipated FR4 may span from 52.6 GHz to 114.25 GHZ. An anticipated FR3 may span from 7.125 GHz to 24.25 GHz. An anticipated FR5 may span from 114.25 GHz to approximately 300 GHz. Therefore, unless specifically stated otherwise, "millimeter wave," if used herein, may also refer to frequencies within the anticipated FR3, FR4, and/or FR5.

As indicated above, FIG. 1 is provided as an example. Other examples may differ from what is described with regard to FIG. 1.

Figure 2:
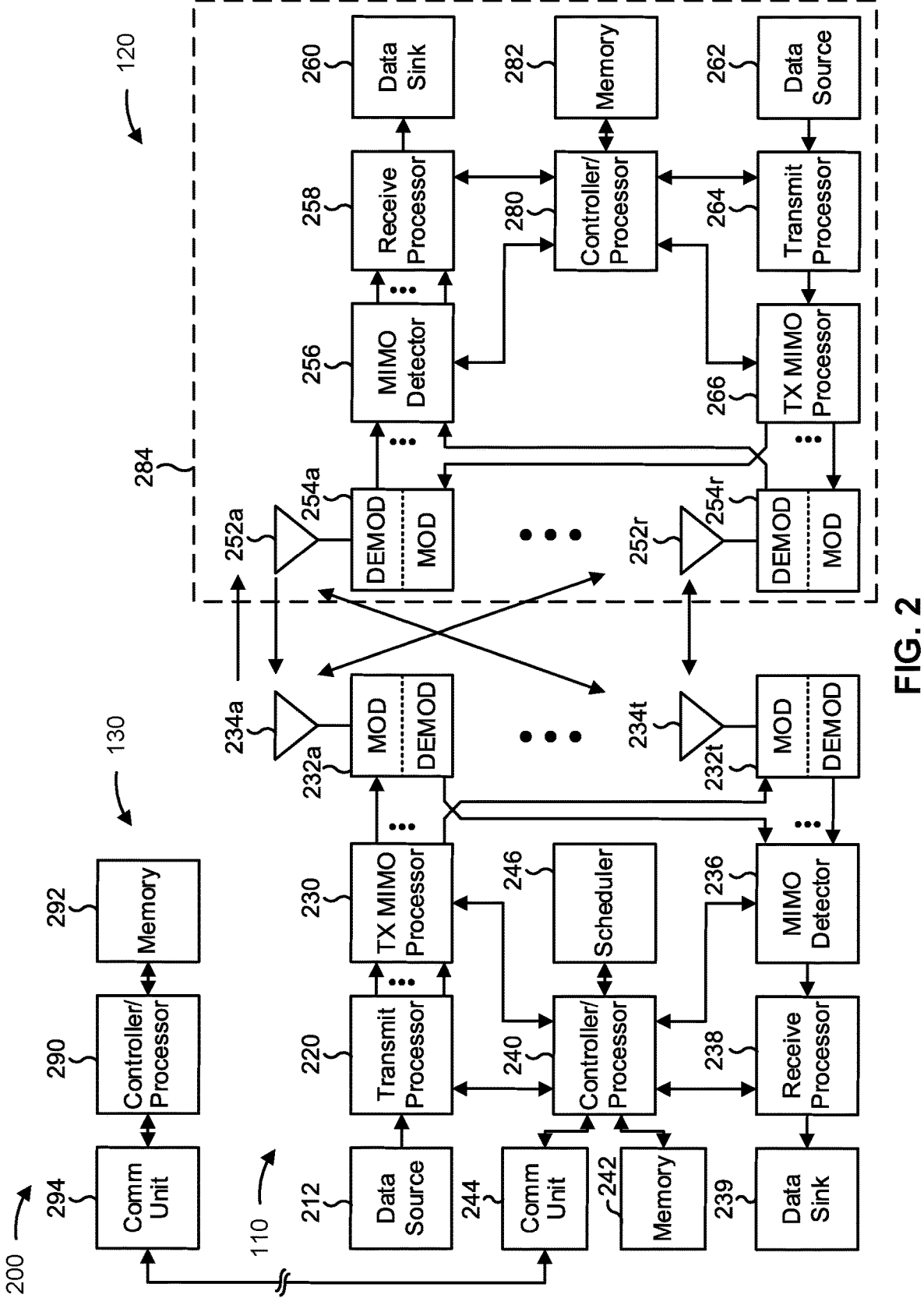
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-14).

Controller/processor 240 of base station 110, controller/processor 280 of UE 120, and/or any other component(s) of FIG. 2 may perform one or more techniques associated with enhanced timing advance (TA) offset value indications, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for receiving, from a base station, an indication of a TA offset value for a high frequency range operating band; and/or means for communicating with the base station in the high frequency range operating band, in accordance with the TA offset value. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for receiving, from the base station, a broadcast transmission indicating the TA offset value. In some aspects, the UE 120 includes means for receiving, from the base station, a dedicated message indicating the TA offset value. In some aspects, the UE 120 includes means for receiving, from the base station, a dynamic indication of the TA offset value. In some aspects, the UE 120 includes means for receiving, from the base station, a medium access control (MAC) control element (MAC-CE) message indicating the TA offset value.

In some aspects, the UE 120 includes means for receiving, from a base station, an indication of at least one of a TA offset value associated with a full-duplex communication mode of the base station or a TA offset value associated with a half-duplex communication mode of the base station; and/or means for communicating, with the base station, in accordance with at least one of the TA offset value associated with the full-duplex communication mode of the base station or the TA offset value associated with the half-duplex communication mode of the base station.

In some aspects, the UE 120 includes means for receiving, from the base station, a broadcast transmission indicating at least one of the TA offset value associated with the full-duplex communication mode of the base station or the TA offset value associated with the half-duplex communication mode of the base station. In some aspects, the UE 120 includes means for receiving, from the base station, a dedicated message indicating at least one of the TA offset value associated with the full-duplex communication mode of the base station or the TA offset value associated with the half-duplex communication mode of the base station. In some aspects, the UE 120 includes means for receiving, from the base station, a dynamic indication of at least one of the TA offset value associated with the full-duplex communication mode of the base station or the TA offset value associated with the half-duplex communication mode of the base station.

In some aspects, the UE 120 includes means for receiving, from the base station, scheduling information associated with a communication that is to be associated with the full-duplex communication mode or the half-duplex communication mode; and/or means for receiving, from the base station, an indication of a TA offset value that is based at least in part on whether the communication is to be associated with the full-duplex communication mode or the half-duplex communication mode.

In some aspects, the UE 120 includes means for receiving, from the base station, scheduling information associated with a communication indicating that the communication is to be associated with the full-duplex communication mode or the half-duplex communication mode; means for determining that the communication is associated with the TA offset value associated with the full-duplex communication mode or the TA offset value associated with the half-duplex communication mode based at least in part on the scheduling information; and/or means for applying the TA offset value associated with the full-duplex communication mode or the TA offset value associated with the half-duplex communication mode when transmitting or receiving the communication.

In some aspects, the UE 120 includes means for receiving an indication of at least one of: a set of resources associated with the full-duplex communication mode of the base station, or a set of resources associated with the half-duplex communication mode of the base station.

In some aspects, the UE 120 includes means for receiving, from the base station, scheduling information associated with a communication indicating one or more resources associated with the communication; means for determining that the one or more resources are included in the set of resources associated with the full-duplex communication mode of the base station or the set of resources associated with the half-duplex communication mode of the base station; and/or means for determining that the communication is associated with the TA offset value associated with the full-duplex communication mode or the TA offset value associated with the half-duplex communication mode based at least in part on determining that the one or more resources are included in the set of resources associated with the full-duplex communication mode of the base station or the set of resources associated with the half-duplex communication mode of the base station.

In some aspects, the base station 110 includes means for determining a TA offset value for a high frequency range operating band; means for transmitting, to one or more UEs, an indication of the TA offset value for the high frequency range operating band; and/or means for communicating, with the one or more UEs in the high frequency range operating band, in accordance with the TA offset value. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station 110 includes means for determining that UEs associated with the base station are to have a same TA offset value; and/or means for broadcasting the indication of the TA offset value. In some aspects, the base station 110 includes means for transmitting, to a UE of the one or more UEs, a dedicated message indicating the TA offset value. In some aspects, the base station 110 includes means for transmitting, to a UE of the one or more UEs, a dynamic indication of the TA offset value. In some aspects, the base station 110 includes means for transmitting, to the UE of the one or more UEs, a MAC-CE message indicating the TA offset value.

In some aspects, the base station 110 includes means for determining at least one of a TA offset value associated with a full-duplex communication mode of the base station or a TA offset value associated with a half-duplex communication mode of the base station; means for transmitting, to one or more UEs, an indication of at least one of the TA offset value associated with the full-duplex communication mode of the base station or the TA offset value associated with the half-duplex communication mode of the base station; and/or means for communicating, with the one or more UEs, in accordance with at least one of the TA offset value associated with the full-duplex communication mode of the base station or the TA offset value associated with the half-duplex communication mode of the base station.

In some aspects, the base station 110 includes means for broadcasting an indication of at least one of the TA offset value associated with the full-duplex communication mode of the base station or the TA offset value associated with the half-duplex communication mode of the base station. In some aspects, the base station 110 includes means for transmitting, to a UE of the one or more UEs, a dedicated message indicating at least one of the TA offset value associated with the full-duplex communication mode of the base station or the TA offset value associated with the half-duplex communication mode of the base station. In some aspects, the base station 110 includes means for transmitting, to a UE of the one or more UEs, a dynamic indication of at least one of the TA offset value associated with the full-duplex communication mode of the base station or the TA offset value associated with the half-duplex communication mode of the base station.

In some aspects, the base station 110 includes means for transmitting, to the one or more UEs, scheduling information associated with a communication that is to be associated with the full-duplex communication mode or the half-duplex communication mode; and/or means for transmitting, to the one or more UEs, an indication of a TA offset value that is based at least in part on whether the communication is to be associated with the full-duplex communication mode or the half-duplex communication mode.

In some aspects, the base station 110 includes means for transmitting, to the one or more UEs, scheduling information associated with a communication indicating that the communication is to be associated with the full-duplex communication mode or the half-duplex communication mode; and/or means for transmitting or receiving, in the full-duplex communication mode or the half-duplex communication mode, the communication, where the one or more UEs are to apply the TA offset value associated with the full-duplex communication mode of the base station or the TA offset value associated with the half-duplex communication mode to the communication based at least in part on the scheduling information.

In some aspects, the base station 110 includes means for transmitting an indication of at least one of: a set of resources associated with the full-duplex communication mode of the base station, or a set of resources associated with the half-duplex communication mode of the base station.

In some aspects, the base station 110 includes means for transmitting, to the one or more UEs, scheduling information associated with a communication indicating one or more resources associated with the communication; and/or means for transmitting or receiving, using the one or more resources, the communication, where the one or more UEs are to apply the TA offset value associated with the full-duplex communication mode of the base station or the TA offset value associated with the half-duplex communication mode to the communication based at least in part on the one or more resources associated with the communication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
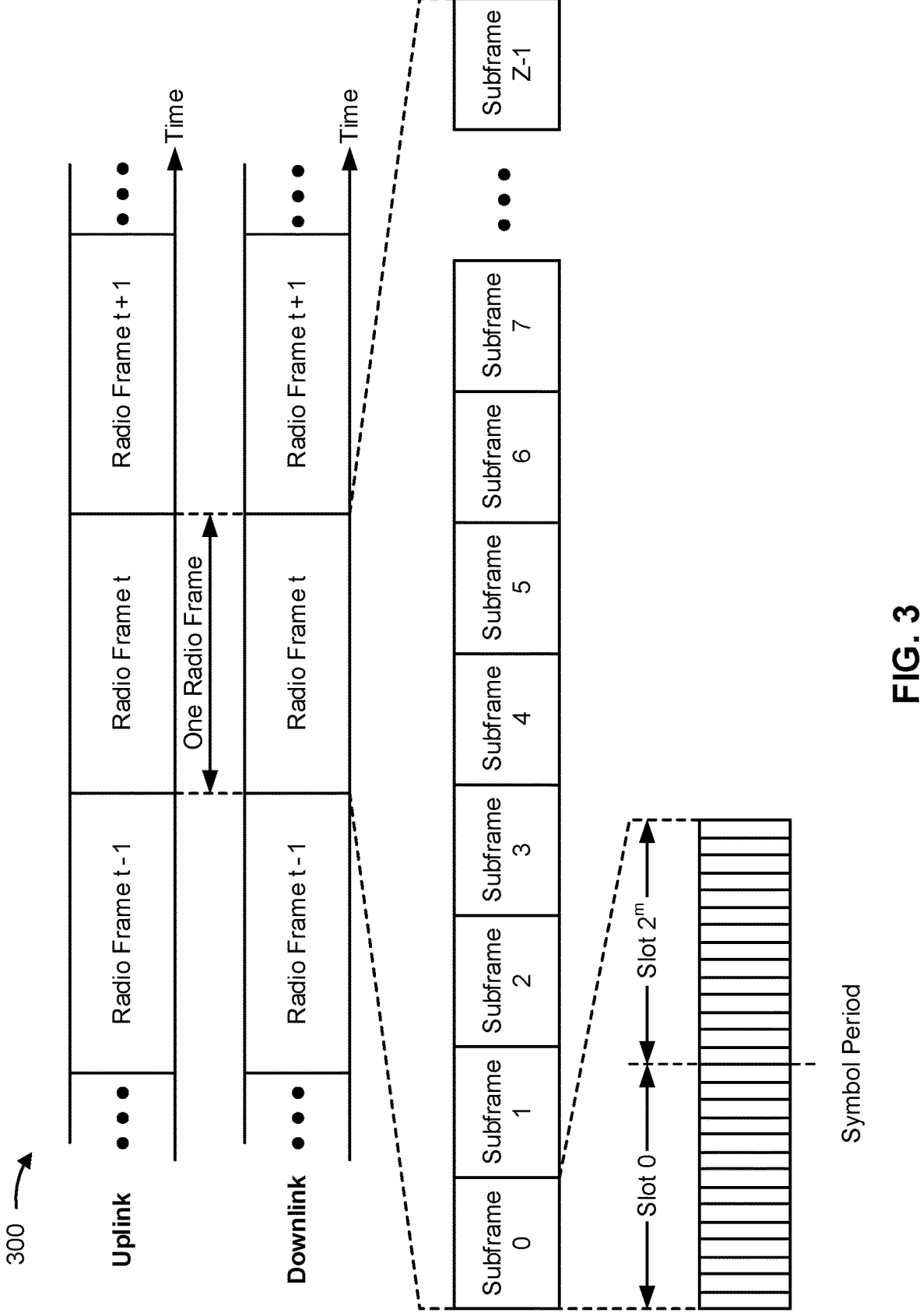
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4B:
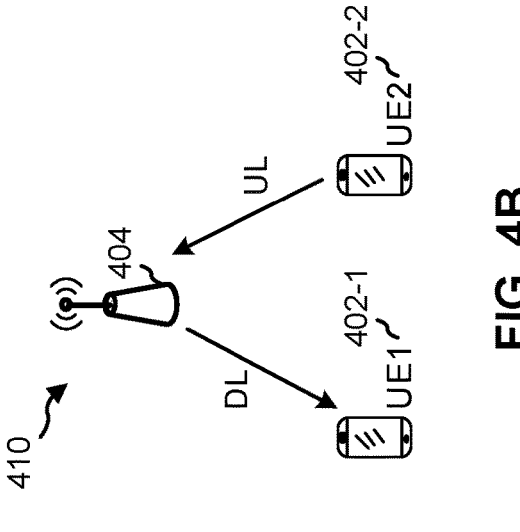
FIGS. 4A-4C are diagrams illustrating examples of full duplex (FD) communication, in accordance with the present disclosure.
Figure 4C:
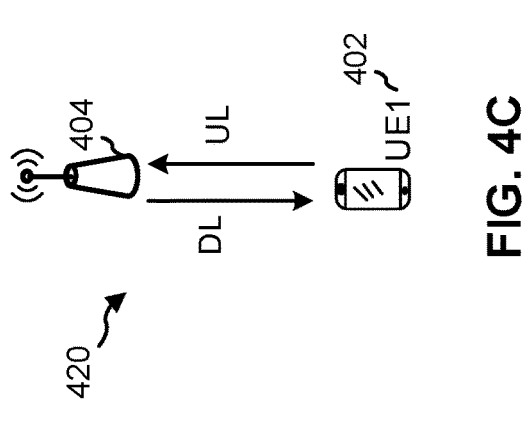
Figure 4A:
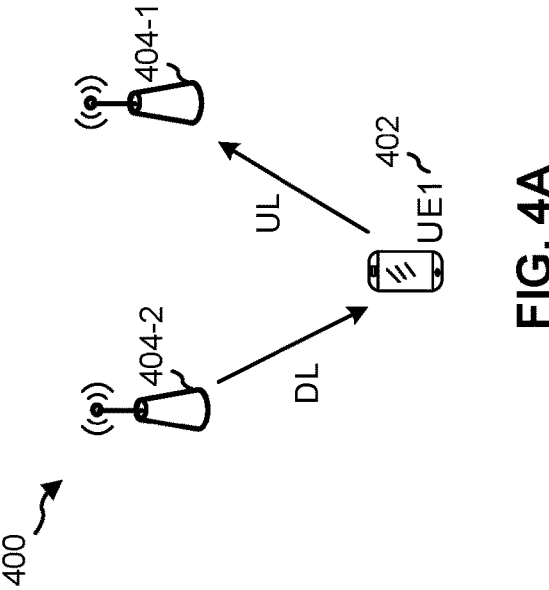

FIGS. 4A-4C are diagrams illustrating examples 400, 410, 420 of full duplex (FD) communication, in accordance with the present disclosure. A "FD communication mode" may refer to a communication mode of a wireless communication device (e.g., a UE 120 or a base station 110) in which the wireless communication device is capable of transmitting communications and receiving communications at the same, or substantially the same, time. The example 400 of FIG. 4A includes a UE1 402 and two base stations (e.g., TRPs) 404-1, 404-2, wherein the UE1 402 is sending UL transmissions to base station 404-1 and is receiving DL transmissions from base station 404-2 (e.g., at the same, or substantially the same, time). In the example 400 of FIG. 4A, FD is enabled for the UE1 402, but not for the base stations 404-1, 404-2 (e.g., the base stations 404-1, 404-2 may not be transmitting and receiving at the same, or substantially the same, time).

The example 410 of FIG. 4B includes two UEs, UE1 402-1 and UE2 402-2, and a base station 404, wherein the UE1 402-1 is receiving a DL transmission from the base station 404 and the UE2 402-2 is transmitting a UL transmission to the base station 404 (e.g., at the same, or substantially the same, time). In the example 410 of FIG. 4B, FD is enabled for the base station 404, but not for the UEs UE1 402-1 and UE2 402-2. The example 420 of FIG. 4C includes a UE1 402 and a base station 404, wherein the UE1 402 is receiving a DL transmission from the base station 404 and the UE1 402 is transmitting a UL transmission to the base station 404 (e.g., at the same, or substantially the same, time). In the example 420 of FIG. 4C, FD is enabled for both the UE1 402 and the base station 404.

As indicated above, FIGS. 4A-4C are provided as one or more examples. Other examples may differ from what is described with regard to FIGS. 4A-4C.

Figure 5:
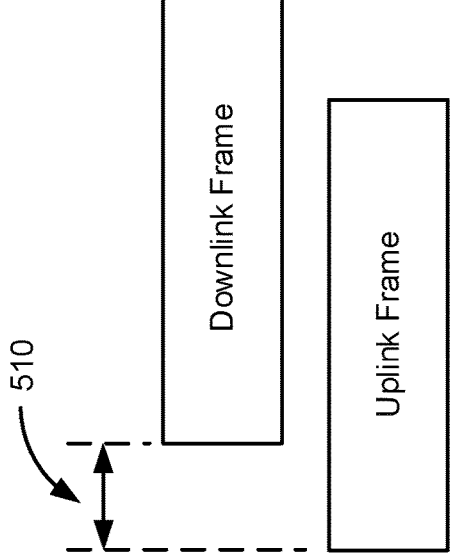
FIG. 5 is a diagram illustrating an example of a transmission timing configuration for a UE, in accordance with the present disclosure.

FIG. 5 is a diagram illustrating an example 500 of a transmission timing configuration for a UE 120, in accordance with the present disclosure. In some wireless communication systems, a timing of the uplink frame may need to be adjusted in order to have alignment with a downlink frame in time domain at a base station 110. For example, an uplink transmission from the UE 120 to the base station 110 may take some time to reach the base station 110. In order to better align uplink frames and downlink frames at the base station 110, the base station 110 may configure a UE 120 to start an uplink frame an amount of time (e.g., depicted by reference number 510 in FIG. 5) before a corresponding downlink frame.

As shown in FIG. 5, a UE 120 may receive a timing configuration for uplink transmissions. For example, a base station 110 may transmit a TA command indicating a TA value. The TA command may be transmitted as part of a random access channel (RACH) procedure (e.g., in a random access response (RAR) message of a RACH procedure). In some aspects, the TA command may be indicated in a MAC-CE message. The TA value may be based at least in part on an amount of time an uplink transmission from the UE 120 takes to reach the base station 110 (e.g., may be based at least in part on a distance between the UE 120 and the base station 110).

The UE 120 may determine the amount of time (depicted by reference number 510 in FIG. 5) before the start of a downlink frame that a corresponding uplink frame is to start based at least in part on the TA value. For example, the UE 120 may determine the amount of time according to the formula: $T_{TA}=(N_{TA}\ N_{TA\ offset})T_c$, where $N_{TA}$ is the TA value, $N_{TA\ offset}$ is a TA offset value, and $T_c$ is a timing constant defined by the 3GPP Specifications. $T_c$ may be based at least in part on a maximum subcarrier spacing and fast-Fourier transform (FFT) size of the wireless network. In some cases, $T_c$ may have a value of 0.509 nanoseconds, among other examples. The TA offset value may be based at least in part on a frequency band or topology (e.g., FDD or time division duplexing (TDD)) that is being used for communications between the UE 120 and the base station 110. The TA offset value may be defined, or otherwise fixed, by the 3GPP Specifications. In some aspects, the TA offset value may account for an amount of time the base station 110 takes to switch between receiving communications and transmitting communications. By starting the uplink frame an amount of time (depicted by reference number 510 in FIG. 5) before the corresponding downlink frame, the base station 110 and the UE 120 may synchronize symbols, thereby reducing inter-symbol interference that may result from the uplink frames and downlink frames not aligning in the time domain at the base station 110.

In some cases, the TA offset value may be a static value. For example, the UE 120 may be provided with a TA offset value by the base station 110 or may determine a default TA offset value based at least in part on a frequency range or duplexing mode (FDD or TDD) that is used for communications between the UE 120 and the base station 110. For example, for FR1, the TA offset value may be a semi-static value (e.g., the base station 110 may configure a TA offset value based at least in part on communication types or a duplexing mode (FDD or TDD) that is used for communications between the UE 120 and the base station 110). However, for FR2, or other millimeter wave operating bands (e.g., FR3, FR4, or FR5), the TA offset value may be a fixed value (e.g., not configurable). Therefore, the base station 110 may be unable to modify the TA offset value for millimeter wave operating bands.

Moreover, in some cases, a base station 110 may be capable of communicating in a FD communication mode (e.g., the base station 110 may be capable of transmitting and receiving communications at the same, or substantially the same, time). Therefore, when the base station 110 is operating in the FD communication mode, a TA offset may not be required (e.g. a value of the TA offset may be zero), as the base station 110 may not need any time to switch between transmitting communications and receiving communications. However, because the TA offset values may be static or semi-static values that are pre-defined, the base station 110 may be unable to configure a TA offset value that is based at least in part on a FD communication mode of the base station 110.

Some techniques and apparatuses described herein enable enhanced TA offset value indications. For example, a base station 110 may be enabled to configure TA offset values for a high frequency range operating band (e.g., FR2, FR3, FR4, or FR5). Additionally, the base station 110 may be enabled to configure different TA offset values for a FD communication mode (e.g., in any frequency range). As a result, the base station 110 may have more control over configuring the TA offset value, resulting in improved communication performance and/or improved spectral efficiency, among other examples.

Figure 6:
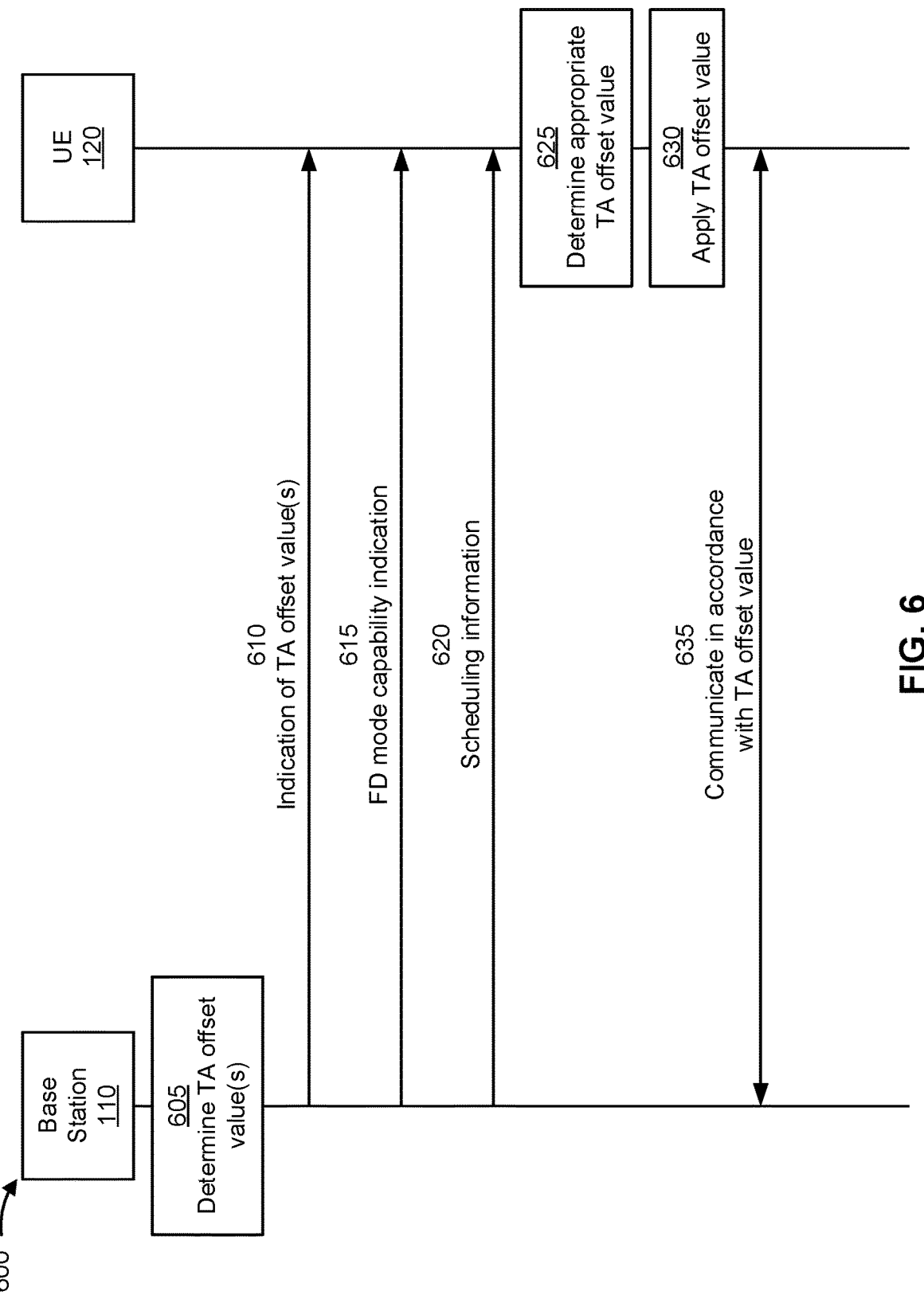
FIG. 6 is a diagram illustrating an example associated with enhanced timing advance (TA) offset value indications, in accordance with the present disclosure.

FIG. 6 is a diagram illustrating an example 600 associated with enhanced TA offset value indications, in accordance with the present disclosure. As shown in FIG. 6, a base station 110 and a UE 120 may communicate with one another. In some aspects, the base station 110 and the UE 120 may be included in a wireless network, such as wireless network 100. The base station 110 and UE 120 may communicate on a wireless access link, which may include an uplink and a downlink.

As show by reference number 605, the base station 110 may determine one or more TA offset values for communications between the base station 110 and the UE 120. For example, the base station 110 may determine a TA offset value for a high frequency range operating band. The high frequency range operating band may be FR2, FR3, FR4, or FR5, among other examples. For example, the high frequency range operating band may include an operating band including frequencies from 24.25 GHz to 52.6 GHz, a millimeter wave operating band, or an operating band including frequencies greater than 7.125 GHz, among other examples. In some aspects, the base station 110 may determine a TA offset value for a high frequency range operating band that is different than a default TA offset value for the high frequency range operating band. The default TA offset value for the high frequency range operating band may be a preconfigured TA offset value for the high frequency range operating band or a TA offset value for the high frequency range operating band defined, or otherwise fixed, by 3GPP Specifications, among other examples.

In some aspects, the base station 110 may determine at least one of a TA offset value associated with a FD communication mode of the base station 110 or a TA offset value associated with a half-duplex communication mode (e.g., where the base station 110 does not transmit and receive at the same, or substantially the same, time) of the base station 110. The TA offset value associated with the FD communication mode of the base station 110 and/or the TA offset value associated with the half-duplex communication mode may apply to all operating frequencies between the UE 120 and the base station 110 (e.g., FR1, FR2, FR3, FR4, or FR5).

In some aspects, the base station 110 may determine a TA offset value associated with the FD communication mode of the base station 110 and may use a default TA offset value for the half-duplex communication mode. In some aspects, the base station 110 may determine that the TA offset value associated with the FD communication mode of the base station 110 is less than a default TA offset value. In some aspects, the base station 110 may determine that the TA offset value associated with the FD communication mode of the base station 110 is zero (e.g., indicating that no TA offset is required when the base station 110 is operating in the FD communication mode).

As shown by reference number 610, the base station 110 may transmit, and the UE 120 may receive, an indication of one or more TA offset values. For example, the base station 110 may transmit an indication of the TA offset value for the high frequency range operating band. The base station 110 may transmit an indication of the TA offset value associated with the FD communication mode of the base station 110. The base station 110 may transmit an indication of the TA offset value associated with the half-duplex communication mode of the base station 110.

In some aspects, the base station 110 may transmit the indication of the TA offset value(s) in a broadcast transmission. For example, the base station 110 may determine that all UEs 120 associated with the base station 110 (e.g., all UEs 120 within a coverage area of the base station 110) are to be configured with the same TA offset value(s). The base station 110 may broadcast the indication of the TA offset value(s). In some aspects, only a subset of UEs 120 of all UEs 120 associated with the base station 110 may be configured to receive the indication of the TA offset value(s) in the broadcast transmission. For example, some UEs 120 may be capable of receiving and/or decoding the signal carrying the indication of the TA offset value(s) and other UEs 120 may not be capable of receiving and/or decoding the signal carrying the indication of the TA offset value(s). The UEs 120 that are not be capable of receiving and/or decoding the signal carrying the indication of the TA offset value(s) may use the default or preconfigured TA offset values. In some aspects, the base station 110 may transmit the indication of the TA offset value(s) in a dedicated message (e.g., a unicast transmission for a specific UE 120). The dedicated message may be a radio resource control (RRC) message, among other examples.

In some aspects, the base station 110 may transmit the indication of the TA offset value(s) in a dynamic message. The dynamic message may be a MAC-CE message or a downlink control information (DCI) message, among other examples. The dynamic message may indicate a TA offset value from one or more configured TA offset values (e.g., default TA offset value(s) or TA offset value(s) determined by the base station 110, as described herein). For example, the dynamic message may indicate whether a default TA offset value or a TA offset value determined (or configured) by the base station 110 is to be used by the UE 120 for one or more upcoming communications.

As shown by reference number 615, the base station 110 may transmit, and the UE 120 may receive, a FD communication mode capability indication. In some aspects, the FD communication mode capability indication may indicate that the base station 110 is capable of communicating in a FD communication mode. In some aspects, the FD communication mode capability indication may indicate a set of resources (e.g., time domain resources and/or frequency domain resources) associated with the FD communication mode of the base station 110 and/or a set of resources (e.g., time domain resources and/or frequency domain resources) associated with the half-duplex communication mode of the base station. For example, the base station 110 may indicate one or more FD slots (e.g., during which the base station 110 operates in a FD communication mode) and one or more half-duplex slots (e.g., during which the base station 110 operates in a half-duplex communication mode).

As shown by reference number 620, the base station 110 may transmit, and the UE 120 may receive, scheduling information for one or more upcoming communications. The scheduling information may indicate whether a communication is to be associated with the FD communication mode of the base station 110 or the half-duplex communication mode of the base station 110. The scheduling information may indicate one or more resources (e.g., time domain resources and/or frequency domain resources) associated with a communication.

As shown by reference number 625, the UE 120 may determine an appropriate TA offset value for one or more upcoming communications. In some aspects, the UE 120 may determine a TA offset value based at least in part on the indication of the TA offset value received from the base station 110. For example, the base station 110 may indicate a TA offset value for a high frequency range operating band. The UE 120 may determine that the UE 120 is operating in the high frequency range operating band and may determine that the TA offset value for the high frequency range operating band is to apply to upcoming communications. Similarly, the base station 110 may indicate that a duplexing mode (FD or half-duplex) that the base station 110 is operating in for upcoming communications. The base station 110 may indicate a TA offset value associated with the FD communication mode or a TA offset value associated with the half-duplex communication mode. The UE 120 may determine a TA offset value (e.g., the TA offset value associated with the FD communication mode or the TA offset value associated with the half-duplex communication mode) based at least in part on the indication by the base station 110.

In some aspects, the UE 120 may determine an appropriate TA offset value for one or more upcoming communications based at least in part on scheduling information associated with the one or more upcoming communications. For example, the UE 120 may determine a duplexing mode (FD or half-duplex) that the base station 110 is operating in for the one or more upcoming communications based at least in part on the scheduling information. The base station 110 may have previously indicated TA offset values associated with the FD communication mode or the half-duplex communication mode, as described herein. The UE 120 may determine an appropriate TA offset value based at least in part on the duplexing mode (FD or half-duplex) that the base station 110 is operating in for the one or more upcoming communications.

In some aspects, the UE 120 may determine an appropriate TA offset value for one or more upcoming communications based at least in part on resources associated with the one or more upcoming communications. For example, the UE 120 may determine whether an upcoming communication is associated with FD resources (e.g., a FD slot) or half-duplex resources (e.g., a half-duplex slot). The UE 120 may determine a TA offset value (e.g., from the previously indicated TA offset value(s), as described herein) based at least in part on whether the upcoming communication is associated with FD resources (e.g., a FD slot) or half-duplex resources (e.g., a half-duplex slot).

As shown by reference number 630, the UE 120 may apply the TA offset value as part of a timing coordination procedure with the base station 110. For example, the UE 120 may determine an amount of time that an uplink frame is to start before the start of a downlink frame, as described above in connection with FIG. 5. The UE 120 may use a TA value and the TA offset value to determine the amount of time that an uplink frame is to start before the start of a downlink frame.

As shown by reference number 635, the base station 110 and the UE 120 may communicate in accordance with the TA offset value. For example, the UE 120 may transmit, and the base station 110 may receive, uplink communications in an uplink frame. The base station 110 may transmit, and the UE 120 may receive, downlink communications in a downlink frame. A transmission timing of the uplink frame may be based at least in part on the TA offset value, as described above. In some aspects, the base station 110 and the UE 120 may communicate in a high frequency range operating band (e.g., FR2, FR3, FR4, or FR5). In some aspects, the base station 110 may communicate with the UE 120 while operating in a FD communication mode (e.g., where the UE 120 applies a TA offset value associated with the FD communication mode). In some aspects, the base station 110 may communicate with the UE 120 while operating in a half-duplex communication mode (e.g., where the UE 120 applies a TA offset value associated with the half-duplex communication mode). As a result, the base station 110 may have more control over configuring the TA offset value, resulting in improved communication performance and/or improved spectral efficiency, among other examples.

As indicated above, FIG. 6 is provided as an example. Other examples may differ from what is described with respect to FIG. 6.

Figure 7:
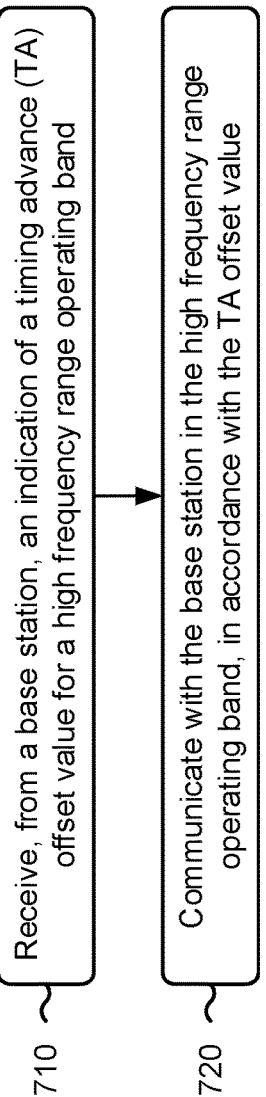

FIG. 7 is a diagram illustrating an example process 700 performed, for example, by a UE, in accordance with the present disclosure. Example process 700 is an example where the UE (e.g., UE 120) performs operations associated with enhanced TA offset value indications.

As shown in FIG. 7, in some aspects, process 700 may include receiving, from a base station, an indication of a TA offset value for a high frequency range operating band (block 710). For example, the UE (e.g., using reception component 1102, depicted in FIG. 11) may receive, from a base station, an indication of a TA offset value for a high frequency range operating band, as described above.

As further shown in FIG. 7, in some aspects, process 700 may include communicating with the base station in the high frequency range operating band, in accordance with the TA offset value (block 720). For example, the UE (e.g., using communication component 1108, depicted in FIG. 11) may communicate with the base station in the high frequency range operating band, in accordance with the TA offset value, as described above.

Process 700 may include additional aspects, such as any single aspect or any combination of aspects described below and/or in connection with one or more other processes described elsewhere herein.

In a first aspect, the high frequency range operating band includes at least one of an operating band including frequencies from 24.25 GHz to 52.6 GHz, a millimeter wave operating band, or an operating band including frequencies greater than 7.125 GHz.

In a second aspect, alone or in combination with the first aspect, receiving the indication of the TA offset value for the high frequency range operating band includes receiving, from the base station, a broadcast transmission indicating the TA offset value.

In a third aspect, alone or in combination with one or more of the first and second aspects, receiving the indication of the TA offset value for the high frequency range operating band includes receiving, from the base station, a dedicated message indicating the TA offset value.

In a fourth aspect, alone or in combination with one or more of the first through third aspects, receiving the indication of the TA offset value for the high frequency range operating band includes receiving, from the base station, a dynamic indication of the TA offset value.

In a fifth aspect, alone or in combination with one or more of the first through fourth aspects, receiving the dynamic indication of the TA offset value includes receiving, from the base station, a MAC-CE message indicating the TA offset value.

In a sixth aspect, alone or in combination with one or more of the first through fifth aspects, the TA offset value is different than a default TA offset value for the high frequency range operating band.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with enhanced TA offset value indications.

As shown in FIG. 8, in some aspects, process 800 may include determining a TA offset value for a high frequency range operating band (block 810). For example, the base station (e.g., using determination component 1208, depicted in FIG. 12) may determine a TA offset value for a high frequency range operating band, as described above.

As further shown in FIG. 8, in some aspects, process 800 may include transmitting, to one or more UEs, an indication of the TA offset value for the high frequency range operating band (block 820). For example, the base station (e.g., using transmission component 1204, depicted in FIG. 12) may transmit, to one or more UEs, an indication of the TA offset value for the high frequency range operating band, as described above.

As further shown in FIG. 8, in some aspects, process 800 may include communicating, with the one or more UEs in the high frequency range operating band, in accordance with the TA offset value (block 830). For example, the base station (e.g., using communication component 1210, depicted in FIG. 12) may communicate, with the one or more UEs in the high frequency range operating band, in accordance with the TA offset value, as described above.

Process 800 may include additional aspects, such as any single aspect or any combination of aspects described below and/or in connection with one or more other processes described elsewhere herein.

In a first aspect, the high frequency range operating band includes at least one of an operating band including frequencies from 24.25 GHz to 52.6 GHz, a millimeter wave operating band, or an operating band including frequencies greater than 7.125 GHz.

In a second aspect, alone or in combination with the first aspect, transmitting the indication of the TA offset value for the high frequency range operating band includes determining that UEs associated with the base station are to have a same TA offset value, and broadcasting the indication of the TA offset value.

In a third aspect, alone or in combination with one or more of the first and second aspects, transmitting the indication of the TA offset value for the high frequency range operating band includes transmitting, to a UE of the one or more UEs, a dedicated message indicating the TA offset value.

In a fourth aspect, alone or in combination with one or more of the first through third aspects, transmitting the indication of the TA offset value for the high frequency range operating band includes transmitting, to a UE of the one or more UEs, a dynamic indication of the TA offset value.

In a fifth aspect, alone or in combination with one or more of the first through fourth aspects, transmitting the dynamic indication of the TA offset value includes transmitting, to the UE of the one or more UEs, a MAC-CE message indicating the TA offset value.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a UE, in accordance with the present disclosure. Example process 900 is an example where the UE (e.g., UE 120) performs operations associated with enhanced TA offset value indications.

As shown in FIG. 9, in some aspects, process 900 may include receiving, from a base station, an indication of at least one of a TA offset value associated with a full-duplex communication mode of the base station or a TA offset value associated with a half-duplex communication mode of the base station (block 910). For example, the UE (e.g., using reception component 1302, depicted in FIG. 13) may receive, from a base station, an indication of at least one of a TA offset value associated with a full-duplex communication mode of the base station or a TA offset value associated with a half-duplex communication mode of the base station, as described above.

As further shown in FIG. 9, in some aspects, process 900 may include communicating, with the base station, in accordance with at least one of the TA offset value associated with the full-duplex communication mode of the base station or the TA offset value associated with the half-duplex communication mode of the base station (block 920). For example, the UE (e.g., using communication component 1308, depicted in FIG. 13) may communicate, with the base station, in accordance with at least one of the TA offset value associated with the full-duplex communication mode of the base station or the TA offset value associated with the half-duplex communication mode of the base station, as described above.

Process 900 may include additional aspects, such as any single aspect or any combination of aspects described below and/or in connection with one or more other processes described elsewhere herein.

In a first aspect, receiving the indication of at least one of the TA offset value associated with the full-duplex communication mode of the base station or the TA offset value associated with the half-duplex communication mode of the base station includes receiving, from the base station, a broadcast transmission indicating at least one of the TA offset value associated with the full-duplex communication mode of the base station or the TA offset value associated with the half-duplex communication mode of the base station.

In a second aspect, alone or in combination with the first aspect, receiving the indication of at least one of the TA offset value associated with the full-duplex communication mode of the base station or the TA offset value associated with the half-duplex communication mode of the base station includes receiving, from the base station, a dedicated message indicating at least one of the TA offset value associated with the full-duplex communication mode of the base station or the TA offset value associated with the half-duplex communication mode of the base station.

In a third aspect, alone or in combination with one or more of the first and second aspects, receiving the indication of at least one of the TA offset value associated with the full-duplex communication mode of the base station or the TA offset value associated with the half-duplex communication mode of the base station includes receiving, from the base station, a dynamic indication of at least one of the TA offset value associated with the full-duplex communication mode of the base station or the TA offset value associated with the half-duplex communication mode of the base station.

In a fourth aspect, alone or in combination with one or more of the first through third aspects, receiving the indication of at least one of the TA offset value associated with the full-duplex communication mode of the base station or the TA offset value associated with the half-duplex communication mode of the base station includes receiving, from the base station, scheduling information associated with a communication that is to be associated with the full-duplex communication mode or the half-duplex communication mode, and receiving, from the base station, an indication of a TA offset value that is based at least in part on whether the communication is to be associated with the full-duplex communication mode or the half-duplex communication mode.

In a fifth aspect, alone or in combination with one or more of the first through fourth aspects, communicating, with the base station, in accordance with at least one of the TA offset value associated with the full-duplex communication mode of the base station or the TA offset value associated with the half-duplex communication mode of the base station includes receiving, from the base station, scheduling information associated with a communication indicating that the communication is to be associated with the full-duplex communication mode or the half-duplex communication mode, determining that the communication is associated with the TA offset value associated with the full-duplex communication mode or the TA offset value associated with the half-duplex communication mode based at least in part on the scheduling information, and applying the TA offset value associated with the full-duplex communication mode or the TA offset value associated with the half-duplex communication mode when transmitting or receiving the communication.

In a sixth aspect, alone or in combination with one or more of the first through fifth aspects, receiving the indication of at least one of the TA offset value associated with the full-duplex communication mode of the base station or the TA offset value associated with the half-duplex communication mode of the base station includes receiving an indication of at least one of a set of resources associated with the full-duplex communication mode of the base station, or a set of resources associated with the half-duplex communication mode of the base station.

In a seventh aspect, alone or in combination with one or more of the first through sixth aspects, communicating, with the base station, in accordance with at least one of the TA offset value associated with the full-duplex communication mode of the base station or the TA offset value associated with the half-duplex communication mode of the base station includes receiving, from the base station, scheduling information associated with a communication indicating one or more resources associated with the communication, determining that the one or more resources are included in the set of resources associated with the full-duplex communication mode of the base station or the set of resources associated with the half-duplex communication mode of the base station, and determining that the communication is associated with the TA offset value associated with the full-duplex communication mode or the TA offset value associated with the half-duplex communication mode based at least in part on determining that the one or more resources are included in the set of resources associated with the full-duplex communication mode of the base station or the set of resources associated with the half-duplex communication mode of the base station.

In an eighth aspect, alone or in combination with one or more of the first through seventh aspects, the set of resources associated with the full-duplex communication mode of the base station or the set of resources associated with the half-duplex communication mode of the base station include at least one of one or more time domain resources, or one or more frequency domain resources.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with the present disclosure. Example process 1000 is an example where the base station (e.g., base station 110) performs operations associated with enhanced TA offset value indications.

As shown in FIG. 10, in some aspects, process 1000 may include determining at least one of a TA offset value associated with a full-duplex communication mode of the base station or a TA offset value associated with a half-duplex communication mode of the base station (block 1010). For example, the base station (e.g., using determination component 1408, depicted in FIG. 14) may determine at least one of a TA offset value associated with a full-duplex communication mode of the base station or a TA offset value associated with a half-duplex communication mode of the base station, as described above.

As further shown in FIG. 10, in some aspects, process 1000 may include transmitting, to one or more UEs, an indication of at least one of the TA offset value associated with the full-duplex communication mode of the base station or the TA offset value associated with the half-duplex communication mode of the base station (block 1020). For example, the base station (e.g., using transmission component 1404, depicted in FIG. 14) may transmit, to one or more UEs, an indication of at least one of the TA offset value associated with the full-duplex communication mode of the base station or the TA offset value associated with the half-duplex communication mode of the base station, as described above.

As further shown in FIG. 10, in some aspects, process 1000 may include communicating, with the one or more UEs, in accordance with at least one of the TA offset value associated with the full-duplex communication mode of the base station or the TA offset value associated with the half-duplex communication mode of the base station (block 1030). For example, the base station (e.g., using communication component 1410, depicted in FIG. 14) may communicate, with the one or more UEs, in accordance with at least one of the TA offset value associated with the full-duplex communication mode of the base station or the TA offset value associated with the half-duplex communication mode of the base station, as described above.

Process 1000 may include additional aspects, such as any single aspect or any combination of aspects described below and/or in connection with one or more other processes described elsewhere herein.

In a first aspect, transmitting the indication of at least one of the TA offset value associated with the full-duplex communication mode of the base station or the TA offset value associated with the half-duplex communication mode of the base station includes broadcasting an indication of at least one of the TA offset value associated with the full-duplex communication mode of the base station or the TA offset value associated with the half-duplex communication mode of the base station.

In a second aspect, alone or in combination with the first aspect, transmitting the indication of at least one of the TA offset value associated with the full-duplex communication mode of the base station or the TA offset value associated with the half-duplex communication mode of the base station includes transmitting, to a UE of the one or more UEs, a dedicated message indicating at least one of the TA offset value associated with the full-duplex communication mode of the base station or the TA offset value associated with the half-duplex communication mode of the base station.

In a third aspect, alone or in combination with one or more of the first and second aspects, transmitting the indication of at least one of the TA offset value associated with the full-duplex communication mode of the base station or the TA offset value associated with the half-duplex communication mode of the base station includes transmitting, to a UE of the one or more UEs, a dynamic indication of at least one of the TA offset value associated with the full-duplex communication mode of the base station or the TA offset value associated with the half-duplex communication mode of the base station.

In a fourth aspect, alone or in combination with one or more of the first through third aspects, transmitting the indication of at least one of the TA offset value associated with the full-duplex communication mode of the base station or the TA offset value associated with the half-duplex communication mode of the base station includes transmitting, to the one or more UEs, scheduling information associated with a communication that is to be associated with the full-duplex communication mode or the half-duplex communication mode, and transmitting, to the one or more UEs, an indication of a TA offset value that is based at least in part on whether the communication is to be associated with the full-duplex communication mode or the half-duplex communication mode.

In a fifth aspect, alone or in combination with one or more of the first through fourth aspects, communicating, with the one or more UEs, in accordance with at least one of the TA offset value associated with the full-duplex communication mode of the base station or the TA offset value associated with the half-duplex communication mode of the base station includes transmitting, to the one or more UEs, scheduling information associated with a communication indicating that the communication is to be associated with the full-duplex communication mode or the half-duplex communication mode, and transmitting or receiving, in the full-duplex communication mode or the half-duplex communication mode, the communication, where the one or more UEs are to apply the TA offset value associated with the full-duplex communication mode of the base station or the TA offset value associated with the half-duplex communication mode to the communication based at least in part on the scheduling information.

In a sixth aspect, alone or in combination with one or more of the first through fifth aspects, transmitting the indication of at least one of the TA offset value associated with the full-duplex communication mode of the base station or the TA offset value associated with the half-duplex communication mode of the base station includes transmitting an indication of at least one of a set of resources associated with the full-duplex communication mode of the base station, or a set of resources associated with the half-duplex communication mode of the base station.

In a seventh aspect, alone or in combination with one or more of the first through sixth aspects, communicating, with the one or more UEs, in accordance with at least one of the TA offset value associated with the full-duplex communication mode of the base station or the TA offset value associated with the half-duplex communication mode of the base station includes transmitting, to the one or more UEs, scheduling information associated with a communication indicating one or more resources associated with the communication, and transmitting or receiving, using the one or more resources, the communication, where the one or more UEs are to apply the TA offset value associated with the full-duplex communication mode of the base station or the TA offset value associated with the half-duplex communication mode to the communication based at least in part on the one or more resources associated with the communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
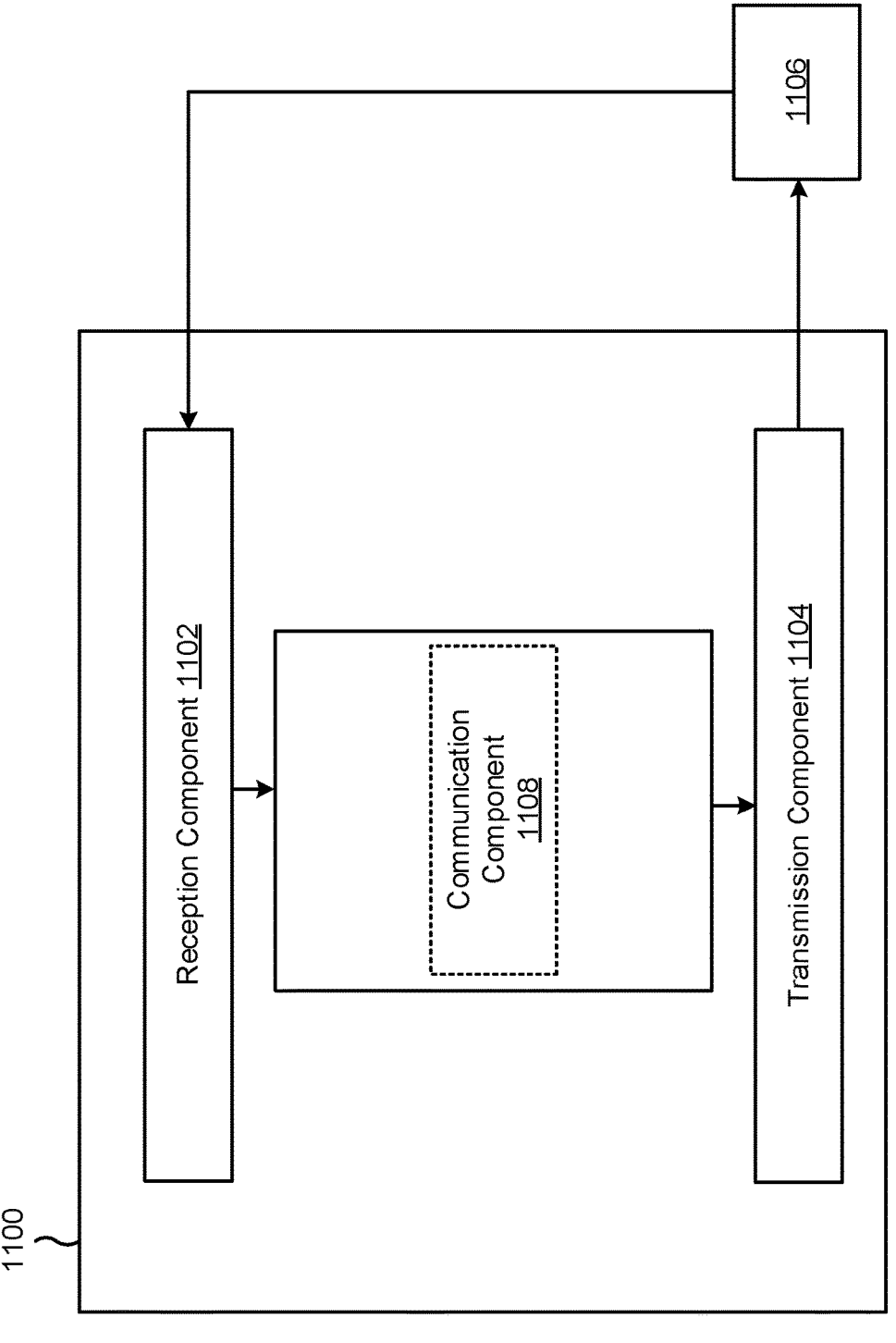
FIGS. 11-14 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication component 1108, among other examples.

In some aspects, the apparatus 1100 may be configured to perform one or more operations described herein in connection with FIG. 6. Additionally or alternatively, the apparatus 1100 may be configured to perform one or more processes described herein, such as process 700 of FIG. 7, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The reception component 1102 may receive, from a base station, an indication of a TA offset value for a high frequency range operating band. The communication component 1108 may communicate with the base station in the high frequency range operating band, in accordance with the TA offset value. In some aspects, the communication component 1108 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the communication component 1108 may cause the reception component 1102 to receive a communication, from the base station in the high frequency range operating band, in accordance with the TA offset value. In some aspects, the communication component 1108 may cause the transmission component 1104 to transmit a communication, to the base station in the high frequency range operating band, in accordance with the TA offset value.

The reception component 1102 may receive, from the base station, a broadcast transmission indicating the TA offset value. The reception component 1102 may receive, from the base station, a dedicated message indicating the TA offset value. The reception component 1102 may receive, from the base station, a dynamic indication of the TA offset value. The reception component 1102 may receive, from the base station, a MAC-CE message indicating the TA offset value.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
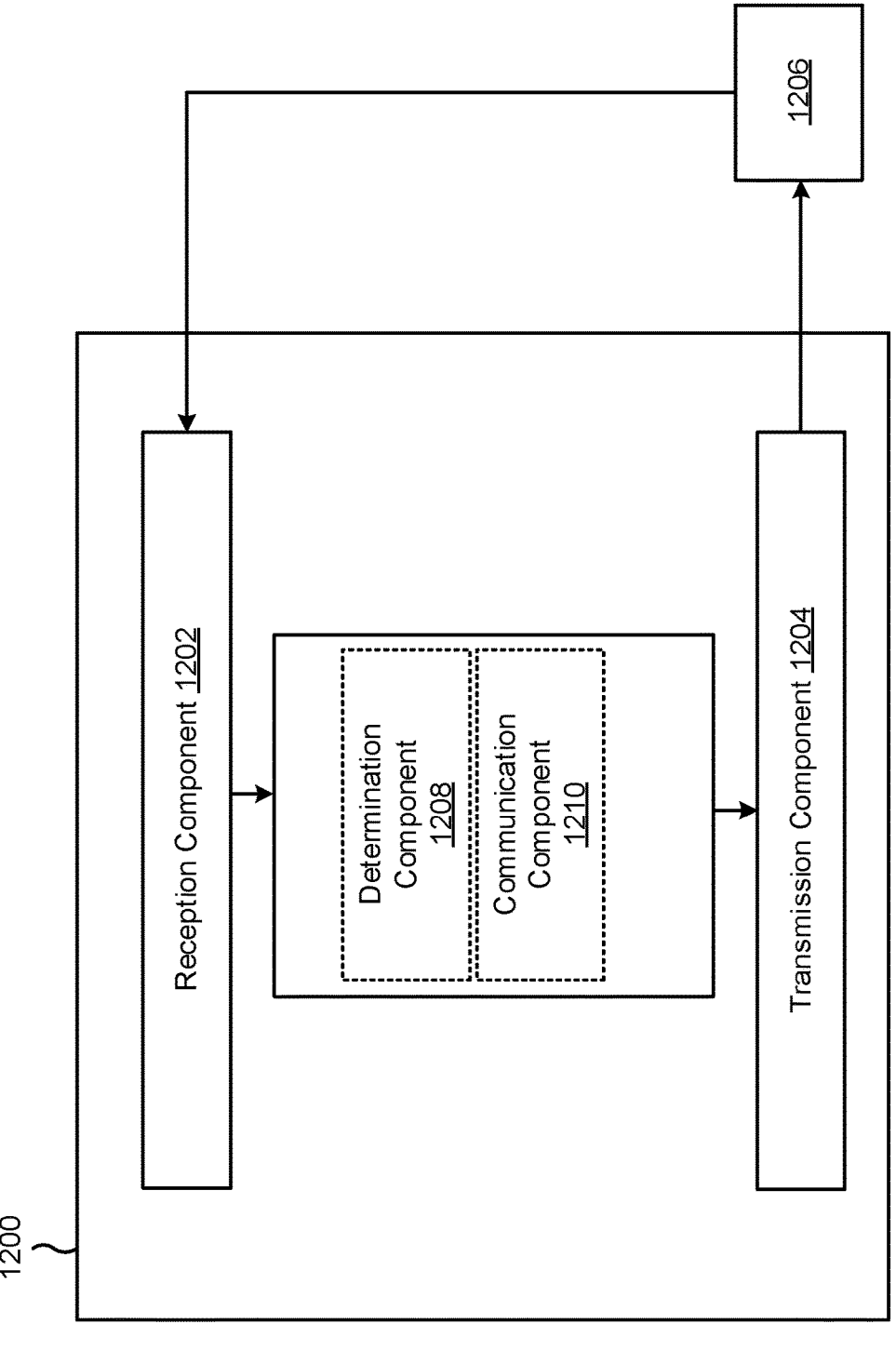

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208 or a communication component 1210, among other examples.

In some aspects, the apparatus 1200 may be configured to perform one or more operations described herein in connection with FIG. 6. Additionally or alternatively, the apparatus 1200 may be configured to perform one or more processes described herein, such as process 800 of FIG. 8, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The determination component 1208 may determine a TA offset value for a high frequency range operating band. In some aspects, the determination component 1208 may include a receive processor, a transmit MIMO processor, a transmit processor, a controller/processor, a memory, or a combination thereof, of the base station described above in connection with FIG. 2. The transmission component 1204 may transmit, to one or more UEs, an indication of the TA offset value for the high frequency range operating band. The communication component 1210 may communicate, with the one or more UEs in the high frequency range operating band, in accordance with the TA offset value. In some aspects, the communication component 1210 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the communication component 1210 may cause the reception component 1202 to receive a communication, from the one or more UEs in the high frequency range operating band, in accordance with the TA offset value. In some aspects, the communication component 1210 may cause the transmission component 1204 to transmit a communication, to the one or more UEs in the high frequency range operating band, in accordance with the TA offset value.

The determination component 1208 may determine that UEs associated with the base station are to have a same TA offset value. The transmission component 1204 may broadcast the indication of the TA offset value. The transmission component 1204 may transmit, to a UE of the one or more UEs, a dedicated message indicating the TA offset value. The transmission component 1204 may transmit, to a UE of the one or more UEs, a dynamic indication of the TA offset value. The transmission component 1204 may transmit, to the UE of the one or more UEs, a MAC-CE message indicating the TA offset value.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
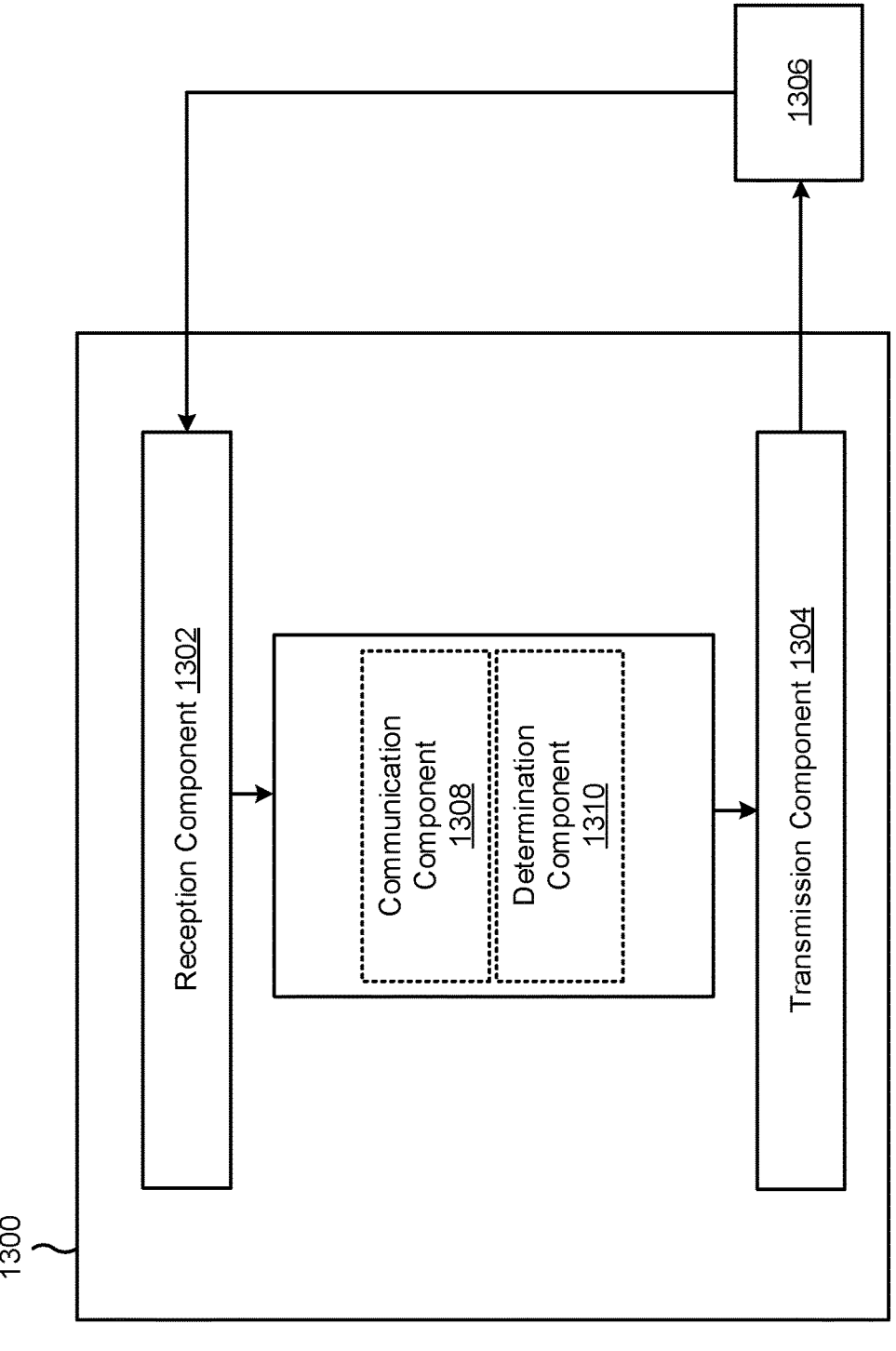

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a communication component 1308 or a determination component 1310, among other examples.

In some aspects, the apparatus 1300 may be configured to perform one or more operations described herein in connection with FIG. 6. Additionally or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be collocated with the reception component 1302 in a transceiver.

The reception component 1302 may receive, from a base station, an indication of at least one of a TA offset value associated with a full-duplex communication mode of the base station or a TA offset value associated with a half-duplex communication mode of the base station. The communication component 1308 may communicate, with the base station, in accordance with at least one of the TA offset value associated with the full-duplex communication mode of the base station or the TA offset value associated with the half-duplex communication mode of the base station. In some aspects, the communication component 1308 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the communication component 1308 may cause the reception component 1302 to receive a communication, from the base station, in accordance with at least one of the TA offset value associated with the full-duplex communication mode of the base station or the TA offset value associated with the half-duplex communication mode of the base station. In some aspects, the communication component 1308 may cause the transmission component 1304 to transmit a communication, to the base station, in accordance with at least one of the TA offset value associated with the full-duplex communication mode of the base station or the TA offset value associated with the half-duplex communication mode of the base station.

The reception component 1302 may receive, from the base station, a broadcast transmission indicating at least one of the TA offset value associated with the full-duplex communication mode of the base station or the TA offset value associated with the half-duplex communication mode of the base station. The reception component 1302 may receive, from the base station, a dedicated message indicating at least one of the TA offset value associated with the full-duplex communication mode of the base station or the TA offset value associated with the half-duplex communication mode of the base station. The reception component 1302 may receive, from the base station, a dynamic indication of at least one of the TA offset value associated with the full-duplex communication mode of the base station or the TA offset value associated with the half-duplex communication mode of the base station.

The reception component 1302 may receive, from the base station, scheduling information associated with a communication that is to be associated with the full-duplex communication mode or the half-duplex communication mode. The reception component 1302 may receive, from the base station, an indication of a TA offset value that is based at least in part on whether the communication is to be associated with the full-duplex communication mode or the half-duplex communication mode.

The reception component 1302 may receive, from the base station, scheduling information associated with a communication indicating that the communication is to be associated with the full-duplex communication mode or the half-duplex communication mode. The determination component 1310 may determine that the communication is associated with the TA offset value associated with the full-duplex communication mode or the TA offset value associated with the half-duplex communication mode based at least in part on the scheduling information. In some aspects, the determination component 1310 may include a receive processor, a transmit MIMO processor, a transmit processor, a controller/processor, a memory, or a combination thereof, of the UE described above in connection with FIG. 2. The communication component 1308 may apply the TA offset value associated with the full-duplex communication mode or the TA offset value associated with the half-duplex communication mode when transmitting or receiving the communication.

The reception component 1302 may receive an indication of at least one of: a set of resources associated with the full-duplex communication mode of the base station, or a set of resources associated with the half-duplex communication mode of the base station. The reception component 1302 may receive, from the base station, scheduling information associated with a communication indicating one or more resources associated with the communication. The determination component 1310 may determine that the one or more resources are included in the set of resources associated with the full-duplex communication mode of the base station or the set of resources associated with the half-duplex communication mode of the base station. The determination component 1310 may determine that the communication is associated with the TA offset value associated with the full-duplex communication mode or the TA offset value associated with the half-duplex communication mode based at least in part on determining that the one or more resources are included in the set of resources associated with the full-duplex communication mode of the base station or the set of resources associated with the half-duplex communication mode of the base station.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
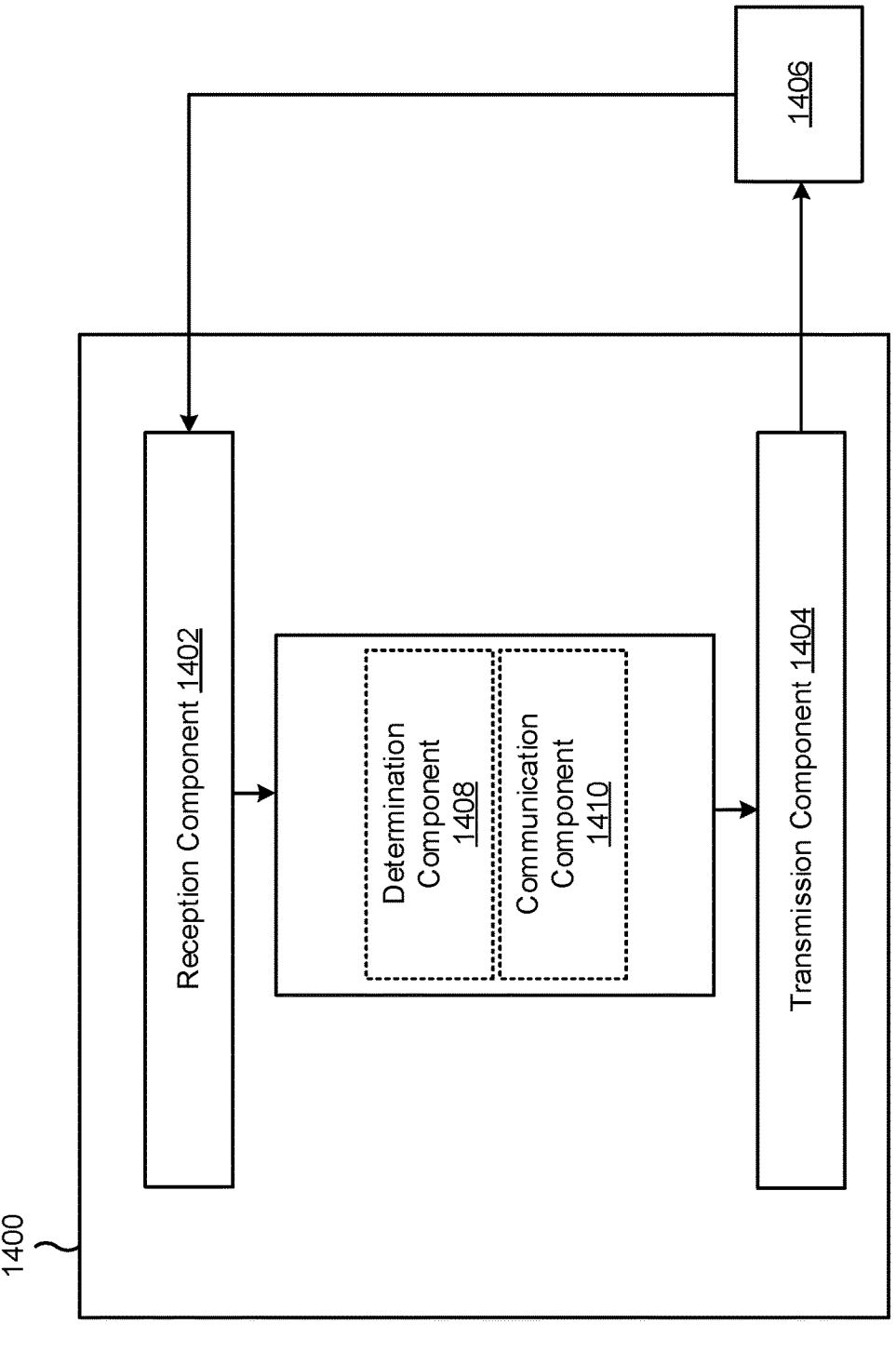

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a determination component 1408 or a communication component 1410, among other examples.

In some aspects, the apparatus 1400 may be configured to perform one or more operations described herein in connection with FIG. 6. Additionally or alternatively, the apparatus 1400 may be configured to perform one or more processes described herein, such as process 1000 of FIG. 10, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be collocated with the reception component 1402 in a transceiver.

The determination component 1408 may determine at least one of a TA offset value associated with a full-duplex communication mode of the base station or a TA offset value associated with a half-duplex communication mode of the base station. In some aspects, the determination component 1408 may include a receive processor, a transmit MIMO processor, a transmit processor, a controller/processor, a memory, or a combination thereof, of the base station described above in connection with FIG. 2. The transmission component 1404 may transmit, to one or more UEs, an indication of at least one of the TA offset value associated with the full-duplex communication mode of the base station or the TA offset value associated with the half-duplex communication mode of the base station. The communication component 1410 may communicate, with the one or more UEs, in accordance with at least one of the TA offset value associated with the full-duplex communication mode of the base station or the TA offset value associated with the half-duplex communication mode of the base station. In some aspects, the communication component 1410 may include one or more antennas, a demodulator, a MIMO detector, a receive processor, a modulator, a transmit MIMO processor, a transmit processor, a controller/processor, a memory, or a combination thereof, of the base station described above in connection with FIG. 2. In some aspects, the communication component 1410 may cause the reception component 1402 to receive a communication, from the one or more UEs, in accordance with at least one of the TA offset value associated with the full-duplex communication mode of the base station or the TA offset value associated with the half-duplex communication mode of the base station. In some aspects, the communication component 1410 may cause the transmission component 1404 to transmit a communication, to the one or more UEs, in accordance with at least one of the TA offset value associated with the full-duplex communication mode of the base station or the TA offset value associated with the half-duplex communication mode of the base station.

The transmission component 1404 may broadcast an indication of at least one of the TA offset value associated with the full-duplex communication mode of the base station or the TA offset value associated with the half-duplex communication mode of the base station. The transmission component 1404 may transmit, to a UE of the one or more UEs, a dedicated message indicating at least one of the TA offset value associated with the full-duplex communication mode of the base station or the TA offset value associated with the half-duplex communication mode of the base station. The transmission component 1404 may transmit, to a UE of the one or more UEs, a dynamic indication of at least one of the TA offset value associated with the full-duplex communication mode of the base station or the TA offset value associated with the half-duplex communication mode of the base station.

The transmission component 1404 may transmit, to the one or more UEs, scheduling information associated with a communication that is to be associated with the full-duplex communication mode or the half-duplex communication mode. The transmission component 1404 may transmit, to the one or more UEs, an indication of a TA offset value that is based at least in part on whether the communication is to be associated with the full-duplex communication mode or the half-duplex communication mode.

The transmission component 1404 may transmit, to the one or more UEs, scheduling information associated with a communication indicating that the communication is to be associated with the full-duplex communication mode or the half-duplex communication mode. The communication component 1410 may cause the transmission component 1404 to transmit or may cause the reception component 1402 to receive, in the full-duplex communication mode or the half-duplex communication mode, the communication, where the one or more UEs are to apply the TA offset value associated with the full-duplex communication mode of the base station or the TA offset value associated with the half-duplex communication mode to the communication based at least in part on the scheduling information.

The transmission component 1404 may transmit an indication of at least one of a set of resources associated with the full-duplex communication mode of the base station, or a set of resources associated with the half-duplex communication mode of the base station. The transmission component 1404 may transmit, to the one or more UEs, scheduling information associated with a communication indicating one or more resources associated with the communication. The communication component 1410 may cause the transmission component 1404 to transmit or may cause the reception component 1402 to receive, using the one or more resources, the communication, where the one or more UEs are to apply the TA offset value associated with the full-duplex communication mode of the base station or the TA offset value associated with the half-duplex communication mode to the communication based at least in part on the one or more resources associated with the communication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a base station, an indication of a timing advance (TA) offset value for a high frequency range operating band; and communicating with the base station in the high frequency range operating band, in accordance with the TA offset value.

Aspect 2: The method of Aspect 1, wherein the high frequency range operating band includes at least one of: an operating band including frequencies from 24.25 gigahertz (GHz) to 52.6 GHz, a millimeter wave operating band, or an operating band including frequencies greater than 7.125 GHz.

Aspect 3: The method of any of Aspects 1-2, wherein receiving the indication of the TA offset value for the high frequency range operating band comprises: receiving, from the base station, a broadcast transmission indicating the TA offset value.

Aspect 4: The method of any of Aspects 1-3, wherein receiving the indication of the TA offset value for the high frequency range operating band comprises: receiving, from the base station, a dedicated message indicating the TA offset value.

Aspect 5: The method of any of Aspects 1-4, wherein receiving the indication of the TA offset value for the high frequency range operating band comprises: receiving, from the base station, a dynamic indication of the TA offset value.

Aspect 6: The method of Aspect 5, wherein receiving the dynamic indication of the TA offset value comprises: receiving, from the base station, a medium access control (MAC) control element (MAC-CE) message indicating the TA offset value.

Aspect 7: The method of any of Aspects 1-6, wherein the TA offset value is different than a default TA offset value for the high frequency range operating band.

Aspect 8: The method of any of Aspects 1-7, wherein the TA offset value is associated with a full-duplex communication mode of the base station.

Aspect 9: A method of wireless communication performed by a base station, comprising: determining a timing advance (TA) offset value for a high frequency range operating band; transmitting, to one or more user equipments (UEs), an indication of the TA offset value for the high frequency range operating band; and communicating, with the one or more UEs in the high frequency range operating band, in accordance with the TA offset value.

Aspect 10: The method of Aspect 9, wherein the high frequency range operating band includes at least one of: an operating band including frequencies from 24.25 gigahertz (GHz) to 52.6 GHz, a millimeter wave operating band, or an operating band including frequencies greater than 7.125 GHz.

Aspect 11: The method of any of Aspects 9-10, wherein transmitting the indication of the TA offset value for the high frequency range operating band comprises: determining that UEs associated with the base station are to have a same TA offset value; and broadcasting the indication of the TA offset value.

Aspect 12: The method of any of Aspects 9-11, wherein transmitting the indication of the TA offset value for the high frequency range operating band comprises: transmitting, to a UE of the one or more UEs, a dedicated message indicating the TA offset value.

Aspect 13: The method of any of Aspects 9-12, wherein transmitting the indication of the TA offset value for the high frequency range operating band comprises: transmitting, to a UE of the one or more UEs, a dynamic indication of the TA offset value.

Aspect 14: The method of Aspect 13, wherein transmitting the dynamic indication of the TA offset value comprises: transmitting, to the UE of the one or more UEs, a medium access control (MAC) control element (MAC-CE) message indicating the TA offset value.

Aspect 15: The method of any of Aspects 9-14, wherein the TA offset value is associated with a full-duplex communication mode of the base station.

Aspect 16: A method of wireless communication performed by a user equipment (UE), comprising: receiving, from a base station, an indication of at least one of a timing advance (TA) offset value associated with a full-duplex communication mode of the base station or a TA offset value associated with a half-duplex communication mode of the base station; and communicating, with the base station, in accordance with at least one of the TA offset value associated with the full-duplex communication mode of the base station or the TA offset value associated with the half-duplex communication mode of the base station.

Aspect 17: The method of Aspect 16, wherein receiving the indication of at least one of the TA offset value associated with the full-duplex communication mode of the base station or the TA offset value associated with the half-duplex communication mode of the base station comprises: receiving, from the base station, a broadcast transmission indicating at least one of the TA offset value associated with the full-duplex communication mode of the base station or the TA offset value associated with the half-duplex communication mode of the base station.

Aspect 18: The method of any of Aspects 16-17, wherein receiving the indication of at least one of the TA offset value associated with the full-duplex communication mode of the base station or the TA offset value associated with the half-duplex communication mode of the base station comprises: receiving, from the base station, a dedicated message indicating at least one of the TA offset value associated with the full-duplex communication mode of the base station or the TA offset value associated with the half-duplex communication mode of the base station.

Aspect 19: The method of any of Aspects 16-18, wherein receiving the indication of at least one of the TA offset value associated with the full-duplex communication mode of the base station or the TA offset value associated with the half-duplex communication mode of the base station comprises: receiving, from the base station, a dynamic indication of at least one of the TA offset value associated with the full-duplex communication mode of the base station or the TA offset value associated with the half-duplex communication mode of the base station.

Aspect 20: The method of any of Aspects 16-19, wherein receiving the indication of at least one of the TA offset value associated with the full-duplex communication mode of the base station or the TA offset value associated with the half-duplex communication mode of the base station comprises: receiving, from the base station, scheduling information associated with a communication that is to be associated with the full-duplex communication mode or the half-duplex communication mode; and receiving, from the base station, an indication of a TA offset value that is based at least in part on whether the communication is to be associated with the full-duplex communication mode or the half-duplex communication mode.

Aspect 21: The method of any of Aspects 16-20, wherein communicating, with the base station, in accordance with at least one of the TA offset value associated with the full-duplex communication mode of the base station or the TA offset value associated with the half-duplex communication mode of the base station comprises: receiving, from the base station, scheduling information associated with a communication indicating that the communication is to be associated with the full-duplex communication mode or the half-duplex communication mode; determining that the communication is associated with the TA offset value associated with the full-duplex communication mode or the TA offset value associated with the half-duplex communication mode based at least in part on the scheduling information; and applying the TA offset value associated with the full-duplex communication mode or the TA offset value associated with the half-duplex communication mode when transmitting or receiving the communication.

Aspect 22: The method of any of Aspects 16-21, wherein receiving the indication of at least one of the TA offset value associated with the full-duplex communication mode of the base station or the TA offset value associated with the half-duplex communication mode of the base station comprises: receiving an indication of at least one of: a set of resources associated with the full-duplex communication mode of the base station, or a set of resources associated with the half-duplex communication mode of the base station.

Aspect 23: The method of Aspect 22, wherein communicating, with the base station, in accordance with at least one of the TA offset value associated with the full-duplex communication mode of the base station or the TA offset value associated with the half-duplex communication mode of the base station comprises: receiving, from the base station, scheduling information associated with a communication indicating one or more resources associated with the communication; determining that the one or more resources are included in the set of resources associated with the full-duplex communication mode of the base station or the set of resources associated with the half-duplex communication mode of the base station; and determining that the communication is associated with the TA offset value associated with the full-duplex communication mode or the TA offset value associated with the half-duplex communication mode based at least in part on determining that the one or more resources are included in the set of resources associated with the full-duplex communication mode of the base station or the set of resources associated with the half-duplex communication mode of the base station.

Aspect 24: The method of any of Aspects 22-23, wherein the set of resources associated with the full-duplex communication mode of the base station or the set of resources associated with the half-duplex communication mode of the base station include at least one of: one or more time domain resources, or one or more frequency domain resources.

Aspect 25: A method of wireless communication performed by a base station, comprising: determining at least one of a timing advance (TA) offset value associated with a full-duplex communication mode of the base station or a TA offset value associated with a half-duplex communication mode of the base station; transmitting, to one or more user equipments (UEs), an indication of at least one of the TA offset value associated with the full-duplex communication mode of the base station or the TA offset value associated with the half-duplex communication mode of the base station; and communicating, with the one or more UEs, in accordance with at least one of the TA offset value associated with the full-duplex communication mode of the base station or the TA offset value associated with the half-duplex communication mode of the base station.

Aspect 26: The method of Aspect 25, wherein transmitting the indication of at least one of the TA offset value associated with the full-duplex communication mode of the base station or the TA offset value associated with the half-duplex communication mode of the base station comprises: broadcasting an indication of at least one of the TA offset value associated with the full-duplex communication mode of the base station or the TA offset value associated with the half-duplex communication mode of the base station.

Aspect 27: The method of any of Aspects 25-26, wherein transmitting the indication of at least one of the TA offset value associated with the full-duplex communication mode of the base station or the TA offset value associated with the half-duplex communication mode of the base station comprises: transmitting, to a UE of the one or more UEs, a dedicated message indicating at least one of the TA offset value associated with the full-duplex communication mode of the base station or the TA offset value associated with the half-duplex communication mode of the base station.

Aspect 28: The method of any of Aspects 25-27, wherein transmitting the indication of at least one of the TA offset value associated with the full-duplex communication mode of the base station or the TA offset value associated with the half-duplex communication mode of the base station comprises: transmitting, to a UE of the one or more UEs, a dynamic indication of at least one of the TA offset value associated with the full-duplex communication mode of the base station or the TA offset value associated with the half-duplex communication mode of the base station.

Aspect 29: The method of any of Aspects 25-28, wherein transmitting the indication of at least one of the TA offset value associated with the full-duplex communication mode of the base station or the TA offset value associated with the half-duplex communication mode of the base station comprises: transmitting, to the one or more UEs, scheduling information associated with a communication that is to be associated with the full-duplex communication mode or the half-duplex communication mode; and transmitting, to the one or more UEs, an indication of a TA offset value that is based at least in part on whether the communication is to be associated with the full-duplex communication mode or the half-duplex communication mode.

Aspect 30: The method of any of Aspects 25-29, wherein communicating, with the one or more UEs, in accordance with at least one of the TA offset value associated with the full-duplex communication mode of the base station or the TA offset value associated with the half-duplex communication mode of the base station comprises: transmitting, to the one or more UEs, scheduling information associated with a communication indicating that the communication is to be associated with the full-duplex communication mode or the half-duplex communication mode; and transmitting or receiving, in the full-duplex communication mode or the half-duplex communication mode, the communication, wherein the one or more UEs are to apply the TA offset value associated with the full-duplex communication mode of the base station or the TA offset value associated with the half-duplex communication mode to the communication based at least in part on the scheduling information.

Aspect 31: The method of any of Aspects 25-30, wherein transmitting the indication of at least one of the TA offset value associated with the full-duplex communication mode of the base station or the TA offset value associated with the half-duplex communication mode of the base station comprises: transmitting an indication of at least one of: a set of resources associated with the full-duplex communication mode of the base station, or a set of resources associated with the half-duplex communication mode of the base station.

Aspect 32: The method of Aspect 31, wherein communicating, with the one or more UEs, in accordance with at least one of the TA offset value associated with the full-duplex communication mode of the base station or the TA offset value associated with the half-duplex communication mode of the base station comprises: transmitting, to the one or more UEs, scheduling information associated with a communication indicating one or more resources associated with the communication; and transmitting or receiving, using the one or more resources, the communication, wherein the one or more UEs are to apply the TA offset value associated with the full-duplex communication mode of the base station or the TA offset value associated with the half-duplex communication mode to the communication based at least in part on the one or more resources associated with the communication.

Aspect 33: An apparatus for wireless communication at a device, comprising a processor; memory coupled with the processor; and instructions stored in the memory and executable by the processor to cause the apparatus to perform the method of one or more of Aspects 1-8 and 16-24.

Aspect 34: A device for wireless communication, comprising a memory and one or more processors coupled to the memory, the one or more processors configured to perform the method of one or more of Aspects 1-8 and 16-24.

Aspect 35: An apparatus for wireless communication, comprising at least one means for performing the method of one or more of Aspects 1-8 and 16-24.

Aspect 36: A non-transitory computer-readable medium storing code for wireless communication, the code comprising instructions executable by a processor to perform the method of one or more of Aspects 1-8 and 16-24.

Aspect 37: A non-transitory computer-readable medium storing a set of instructions for wireless communication, the set of instructions comprising one or more instructions that, when executed by one or more processors of a device, cause the device to perform the method of one or more of Aspects 1-8 and 16-24.

Aspect 38: An apparatus for wireless communication at a device, comprising a processor; memory coupled with the processor; and instructions stored in the memory and executable by the processor to cause the apparatus to perform the method of one or more of Aspects 9-15 and 25-32.

Aspect 39: A device for wireless communication, comprising a memory and one or more processors coupled to the memory, the one or more processors configured to perform the method of one or more of Aspects 9-15 and 25-32.

Aspect 40: An apparatus for wireless communication, comprising at least one means for performing the method of one or more of Aspects 9-15 and 25-32.

Aspect 41: A non-transitory computer-readable medium storing code for wireless communication, the code comprising instructions executable by a processor to perform the method of one or more of Aspects 9-15 and 25-32.

Aspect 42: A non-transitory computer-readable medium storing a set of instructions for wireless communication, the set of instructions comprising one or more instructions that, when executed by one or more processors of a device, cause the device to perform the method of one or more of Aspects 9-15 and 25-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

use a default timing advance (TA) offset value, of a frequency range operating band, for communications between the UE and a base station;

receive, from the base station, a message that includes an indication of multiple TA offset values, wherein the indication includes a first TA offset value associated with a full-duplex communication mode and a second TA offset value associated with a half-duplex communication mode, and wherein the first TA offset value and the second TA offset value are different than the default TA offset value;

receive, from the base station, an indication of one or more full-duplex slots during which the base station operates in the full-duplex communication mode, and an indication of one or more half-duplex slots during which the base station operates in the half-duplex communication mode;

based on a determination that resources associated with an upcoming communication correspond to the one or more full-duplex slots, communicate with the base station in the frequency range operating band using the first TA offset value; and based on a determination that resources associated with an upcoming communication correspond to the one or more half-duplex slots, communicate with the base station in the frequency range operating band using the second TA offset value.

2. The UE of claim 1,
wherein the frequency range operating band includes:
an operating band including frequencies greater than 7.125 GHz.

3. The UE of claim 1,
wherein the one or more processors, to receive the indication of the multiple TA offset values for the frequency range operating band, are configured to:
receive, from the base station, a broadcast transmission indicating the multiple TA offset values.

4. The UE of claim 1,
wherein the one or more processors, to receive the indication of the multiple TA offset values for the frequency range operating band, are configured to:
receive, from the base station, a dedicated message indicating the multiple TA offset values.

5. The UE of claim 1,
wherein the one or more processors, to receive the indication of the multiple TA offset values for the frequency range operating band, are configured to:
receive, from the base station, a dynamic indication of the multiple TA offset values.

6. The UE of claim 1,
wherein the one or more processors are further configured to:
determine that the UE is operating in the frequency range operating band and that another TA offset value of the multiple TA offset values for the frequency range operating band is to apply to upcoming communications, wherein communicating with the base station in accordance with the other TA offset value for the frequency range operating band is based at least in part on the determining.

7. The UE of claim 1,
wherein the first TA offset value is less than the default TA offset value based at least in part on the TA offset value being associated with the full-duplex communication mode of the base station.

8. The UE of claim 1,
wherein the one or more processors are further configured to:
receive, from the base station, an indication of the first TA offset value of a full-duplex communication mode of the base station; and
receive, from the base station, an indication of the second TA offset value of a half-duplex communication mode of the base station.

9. The UE of claim 1,
wherein a first subset of UEs, associated with the base station, support receiving or decoding a signal carrying the indication of the multiple TA offset values, and wherein a second subset UEs, associated with the base station and other than the first subset of UEs, use the default TA offset value.

10. The UE of claim 1, the message that includes the indication of multiple TA offset values is a medium access control (MAC) control element (MAC-CE) message.

11. The UE of claim 1, the message that includes the indication of multiple TA offset values is a downlink control information (DCI) message.

12. A user equipment (UE) for wireless communication, comprising:
a memory; and
one or more processors, coupled to the memory, configured to:
use a default timing advance (TA) offset value, of a frequency range operating band, for communications between the UE and a base station;
receive, from the base station, a message that includes an indication of multiple TA offset values, wherein the indication includes a first TA offset value associated with a full-duplex communication mode and a second TA offset value associated with a half-duplex communication mode, and wherein the first TA offset value and the second TA offset value are different than the default TA offset value, and wherein a first subset of UEs including the UE, associated with the base station, support receiving or decoding a signal carrying the indication of the multiple TA offset values, and wherein a second subset UEs, associated with the base station and other than the first subset of UEs, use the default TA offset value; and
communicate, with the base station, in accordance with the first TA offset value or the second TA offset value, based at least in part on whether the base station operates in the full-duplex communication mode or the half-duplex communication mode.

13. The UE of claim 12,
wherein the one or more processors, to receive the indication, are configured to:
receive, from the base station, a broadcast transmission indicating at least one of a first TA offset value associated with the full-duplex communication mode of the base station or a second TA offset value associated with the half-duplex communication mode of the base station.

14. The UE of claim 12,
wherein the one or more processors, to receive the indication, are configured to:
receive, from the base station, a dedicated message indicating at least one of a first TA offset value associated with the full-duplex communication mode of the base station or a second TA offset value associated with the half-duplex communication mode of the base station.

15. The UE of claim 12,
wherein the one or more processors, to receive the indication, are configured to:
receive, from the base station, a dynamic indication of at least one of the first TA offset value associated with the full-duplex communication mode of the base station or the second TA offset value associated with the half-duplex communication mode of the base station.

16. The UE of claim 12,
wherein the one or more processors, to receive the indication, are configured to:
receive, from the base station, scheduling information associated with a communication that is to be associated with the full-duplex communication mode or the half-duplex communication mode; and
receive, from the base station, an indication of a TA offset value that is based at least in part on whether the communication is to be associated with the full-duplex communication mode or the half-duplex communication mode.

17. The UE of claim 12,
wherein the one or more processors, to communicate, with the base station, in accordance with the first TA offset value or the second TA offset value, are configured to:
receive, from the base station, scheduling information associated with a communication indicating that the communication is to be associated with the full-duplex communication mode or the half-duplex communication mode;
determine that the communication is associated with the first TA offset value associated with the full-duplex communication mode or the second TA offset value associated with the half-duplex communication mode based at least in part on the scheduling information; and
apply the first TA offset value associated with the full-duplex communication mode or the second TA offset value associated with the half-duplex communication mode when transmitting or receiving the communication.

18. The UE of claim 12,
wherein the one or more processors, to receive the indication, are configured to:
receive another indication of at least one of:
a set of resources associated with the full-duplex communication mode of the base station, or
a set of resources associated with the half-duplex communication mode of the base station.

19. The UE of claim 18,
wherein the one or more processors, to communicate, with the base station, in accordance with the first TA offset value or the second TA offset value, are configured to:
receive, from the base station, scheduling information associated with a communication indicating one or more resources associated with the communication;
determine that the one or more resources are included in the set of resources associated with the full-duplex communication mode of the base station or the set of resources associated with the half-duplex communication mode of the base station; and
determine that the communication is associated with the first TA offset value associated with the full-duplex communication mode or the second TA offset value associated with the half-duplex communication mode based at least in part on determining that the one or more resources are included in the set of resources associated with the full-duplex communication mode of the base station or the set of resources associated with the half-duplex communication mode of the base station.

20. A method of wireless communication performed by a user equipment (UE), comprising:
using a default timing advance (TA) offset value, of a frequency range operating band, for communications between the UE and a base station;
receiving, from the base station, a message that includes an indication of multiple TA offset values, wherein the indication includes a TA offset value, different than the default TA offset value, that is configured for the frequency range operating band, wherein a first subset of UEs including the UE, associated with the base station, support receiving or decoding a signal carrying the indication of the multiple TA offset values, and wherein a second subset UEs, associated with the base station and other than the first subset of UEs, use the default TA offset value; and
communicating with the base station in the frequency range operating band, in accordance with the TA offset value, based at least in part on a determination that the TA offset value is appropriate for the communication.

21. The method of claim 20,
wherein the frequency range operating band includes:
an operating band including frequencies greater than 7.125 GHz.

22. The method of claim 20,
wherein receiving the indication of the multiple TA offset values for the frequency range operating band comprises:
receiving, from the base station, a broadcast transmission indicating the multiple TA offset values.

23. The method of claim 20,
wherein receiving the indication of the multiple TA offset values for the frequency range operating band comprises:
receiving, from the base station, a dynamic indication of the multiple TA offset values.

24. The method of claim 20,
wherein the TA offset value is less than the default TA offset value based at least in part on the TA offset value being associated with a full-duplex communication mode of the base station.

25. A method of wireless communication performed by a user equipment (UE), comprising:
using a default timing advance (TA) offset value, of a frequency range operating band, for communications between the UE and a base station;
receiving, from the base station, a message that includes an indication of multiple TA offset values, wherein the indication includes a first TA offset value associated with a full-duplex communication mode and a second TA offset value associated with a half-duplex communication mode, and wherein the first TA offset value and the second TA offset value are different than the default TA offset value, and wherein a first subset of UEs including the UE, associated with the base station, support receiving or decoding a signal carrying the indication of the multiple TA offset values, and wherein a second subset UEs, associated with the base station and other than the first subset of UEs, use the default TA offset value; and
communicating, with the base station, in accordance with the first TA offset value or the second TA offset value based at least in part on whether the base station operates in the full-duplex communication mode or the half-duplex communication mode.

26. The method of claim 25,
wherein receiving the indication of the at least one TA offset value comprises:
receiving, from the base station, a broadcast transmission indicating at least one of the first TA offset value associated with the full-duplex communication mode of the base station or the second TA offset value associated with the half-duplex communication mode of the base station.

27. The method of claim 25,
wherein receiving the indication comprises:
receiving, from the base station, a dedicated message indicating at least one of the first TA offset value associated with the full-duplex communication mode of the base station or the second TA offset value associated with the half-duplex communication mode of the base station.

28. The method of claim 25,
wherein receiving the indication comprises:
receiving, from the base station, a dynamic indication of at least one of the first TA offset value associated with the full-duplex communication mode of the base station or the second TA offset value associated with the half-duplex communication mode of the base station.

29. The method of claim 25,
wherein receiving the indication comprises:
receiving, from the base station, scheduling information associated with a communication that is to be associated with the full-duplex communication mode or the half-duplex communication mode; and
receiving, from the base station, an indication of a TA offset value that is based at least in part on whether the communication is to be associated with the full-duplex communication mode or the half-duplex communication mode.

30. The method of claim 25,
wherein communicating, with the base station, in accordance with the first TA offset value or the second TA offset value comprises:
receiving, from the base station, scheduling information associated with a communication indicating that the communication is to be associated with the full-duplex communication mode or the half-duplex communication mode;
determining that the communication is associated with the first TA offset value associated with the full-duplex communication mode or the second TA offset value associated with the half-duplex communication mode based at least in part on the scheduling information; and

applying the first TA offset value associated with the full-duplex communication mode or the second TA offset value associated with the half-duplex communication mode when transmitting or receiving the communication.

31. The method of claim 25,
wherein receiving the indication comprises:
receiving another indication of at least one of:
a set of resources associated with the full-duplex communication mode of the base station, or
a set of resources associated with the half-duplex communication mode of the base station.

32. The method of claim 31,
wherein communicating, with the base station, in accordance with the first TA offset value or the second TA offset value comprises:
receiving, from the base station, scheduling information associated with a communication indicating one or more resources associated with the communication;
determining that the one or more resources are included in the set of resources associated with the full-duplex communication mode of the base station or the set of resources associated with the half-duplex communication mode of the base station; and
determining that the communication is associated with the first TA offset value associated with the full-duplex communication mode or the second TA offset value associated with the half-duplex communication mode based at least in part on determining that the one or more resources are included in the set of resources associated with the full-duplex communication mode of the base station or the set of resources associated with the half-duplex communication mode of the base station.

* * * * *